(12) United States Patent
Ikuta et al.

(10) Patent No.: US 7,188,793 B2
(45) Date of Patent: Mar. 13, 2007

(54) ELECTRONIC CIRCUIT DEVICE FOR FISHING EQUIPMENT

(75) Inventors: Takeshi Ikuta, Sakai (JP); Ken'ichi Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 396 days.

(21) Appl. No.: 10/831,184

(22) Filed: Apr. 26, 2004

(65) Prior Publication Data

US 2004/0227029 A1 Nov. 18, 2004

(30) Foreign Application Priority Data

May 13, 2003 (JP) ............................. 2003-134900
Jun. 5, 2003 (JP) ............................. 2003-160589

(51) Int. Cl.
*A01K 89/01* (2006.01)

(52) U.S. Cl. ..................... 242/223; 242/288; 188/67; 188/156; 188/161

(58) Field of Classification Search ............... 242/223, 242/225, 226, 288, 319; 188/161, 67, 156, 188/157, 158, 159, 162, 164
See application file for complete search history.

(56) References Cited

U.S. PATENT DOCUMENTS

| | | | | |
|---|---|---|---|---|
| 4,697,758 A | * | 10/1987 | Hirose et al. ............... | 242/223 |
| 5,236,147 A | * | 8/1993 | Kaneko ...................... | 242/223 |
| 5,577,679 A | * | 11/1996 | Thomas ...................... | 242/286 |
| 5,639,038 A | * | 6/1997 | Hirose ........................ | 242/223 |
| 5,833,154 A | * | 11/1998 | Kaneko ...................... | 242/223 |
| 6,126,103 A | * | 10/2000 | Nanbu ........................ | 242/223 |
| 6,249,046 B1 | * | 6/2001 | Hashimoto .................. | 257/691 |
| 6,369,331 B1 | * | 4/2002 | Kusano et al. .............. | 174/260 |
| 6,561,033 B2 | * | 5/2003 | Nanbu et al. ................. | 73/597 |
| 6,565,977 B2 | * | 5/2003 | Bae et al. .................... | 428/414 |
| 6,670,556 B1 | * | 12/2003 | Suehiro ....................... | 174/260 |
| 6,851,636 B2 | * | 2/2005 | Nanbu ........................ | 242/223 |
| 2002/0161549 A1 | | 10/2002 | Stiner | |
| 2005/0109533 A1 | * | 5/2005 | Kurashina et al. .......... | 174/255 |
| 2005/0121299 A1 | * | 6/2005 | Ide et al. .................... | 200/310 |

FOREIGN PATENT DOCUMENTS

| | | |
|---|---|---|
| EP | 1435199 A | 7/2004 |
| JP | 11-332436 A | 12/1999 |

* cited by examiner

*Primary Examiner*—Emmanuel M Marcelo
(74) *Attorney, Agent, or Firm*—Global IP Counselors, LLP

(57) ABSTRACT

A spool control unit includes a circuit board, a plurality of electric components, an external device connector, and an insulating film. The circuit board includes a printed circuit on a surface thereof. The plurality of electric components include a microcomputer that controls the fishing equipment through a control program, and are disposed on the circuit board such that they are electrically connected to the printed circuit. The external device connector is mounted on the circuit board such that it is electronically connected to the printed circuit, and serves to connect to an external device. The insulating film covers at least a portion of the circuit board as well as the electric components but does not cover the regions of the circuit board on which the external device connector is mounted.

31 Claims, 20 Drawing Sheets

ELECTRONIC CIRCUIT DEVICE FOR FISHING EQUIPMENT

BACKGROUND OF THE INVENTION

1. Field of the Invention

The present invention relates to an electronic circuit device. More specifically, the present invention relates to an electronic circuit device for fishing equipment that is used while actually fishing.

2. Background Information

As shown in Japanese patent application publication H11-332436, electronic circuit devices for fishing equipment such as fishing reels are well known in the art. Such well-known electronic circuit devices electronically control and brake the rotation in the line-releasing direction of a spool that is rotatively mounted to a reel unit. Conventional electronic circuit devices are composed of a circuit board that is arranged inside the reel unit, and a plurality of electrical components, which usually include a microcomputer that disposed on the circuit board. A plurality of magnets is mounted to a spool shaft and is sequentially arranged in the rotational direction around the spool shaft. A coil is connected to the circuit board and disposed around the outer periphery of the magnets. The coil is also disposed inside the reel unit. Thus, by mounting the electronic circuit device and the coil inside the reel unit, it will be difficult for the electronic circuit device to get wet and for insulation failure to occur.

Conventional electronic circuit devices configured as noted above control an electric current generated from the coil by the interaction between the magnets and the coil when the spool rotates by a control program stored in a memory inside the microcomputer, and thereby brake the spool. With the aforementioned conventional configuration, ineffective insulation for the fishing reel is unlikely to occur because the electronic circuit device is arranged inside the reel unit. However, the size of the reel unit had to be relatively large to accommodate the electronic circuit device arranged therein. Thus, given the space requirements, it is particularly difficult for electronic control to be implemented in small dual bearing reels. Accordingly, arranging the electronic circuit device on an outer wall of the reel unit rather than inside the reel unit has been considered. For example, disposing the electronic circuit device between the reel unit and the spool has been considered. Thus, if the electronic circuit device were not accommodated in a sealed space such as the interior of the reel unit, but rather in a space that has comparatively more leeway, the electronic circuit device could be provided in a reel without hawing to increase the size of the reel. However, insulation performance may decrease and insulation failure may occur due to being exposed to water when the electronic circuit device is arranged on the outer wall of the reel unit.

On the other hand, in order to change the braking of the fishing reel with regards to the timing of initiation of braking, duration of braking operation or the like, it is convenient if one is able to connect an external device such as a personal computer or the like to the microprocessor in the electronic circuit device. In addition, it is convenient if one can connect an external device such as an inspection device or the like to the microprocessor in order to inspect the electronic circuit device, including electronic circuit devices that have already been insulated by forming an insulating layer thereon. The aforementioned tasks are quite difficult if the microprocessor is located inside the reel and insulated as described above because such conventional electronic circuit devices cannot be accessed from the exterior of the fishing reel.

In view of the above, it will be apparent to those skilled in the art from this disclosure that there exists a need for an improved electronic circuit device for fishing equipment. This invention addresses this need in the art as well as other needs, which will become apparent to those skilled in the art from this disclosure.

SUMMARY OF THE INVENTION

An object of the present invention is to provide superior insulation performance while preventing the enlargement of fishing equipment, and allowing access from the exterior of the fishing equipment to the interior.

An electronic circuit device for fishing equipment according to a first aspect of the present invention is for use in a fishing equipment, and adapted to be connected to an external device, and includes a circuit board, a plurality of electric components, an external device connector, and an insulating film. The circuit board includes at least one electronic circuit on a surface thereof. The plurality of electric components includes a microcomputer that controls the fishing equipment through a control program. The electric components are disposed on the circuit board such that they are electrically connected to the electronic circuit. The external device connector is adapted to connect the external device to the electronic circuit. The insulating film covers the circuit board at least partially so as to cover the electric components.

With this electronic circuit device, the plurality of electric components and the external device connector are disposed on the circuit board, the circuit board and the electric components are covered with the insulating film, and the external device connector is not covered with the insulating film. Here, insulation performance can be maintained at a high level because the circuit board and the electric components that are disposed thereon are covered with an insulating film, excluding the external device connector that cannot be insulated because the connector is designed to connect easily with the external device. In addition, the need to enlarge the fishing equipment can be avoided because the circuit board can be mounted on the exterior of a fishing equipment component rather than arranged inside in order to be shielded from water. Furthermore, the external device connector can be connected with the external device and can be accessed from the exterior because the external device connector is not covered with the insulating film.

An electronic circuit device for fishing equipment according to a second aspect of the present invention is the electronic circuit device of the first aspect, in which the external device connector is at least partially mounted on the circuit board such that the external device connector is electrically connected to the electronic circuit, and the insulating film covers the circuit board at least partially but not where the external device connector is mounted. In this case, even where the external device connector cannot be insulated in order to allow the external device connector to be connected to the external device, the insulating film covers the circuit board and the electric devices mounted thereon except where the external device connector is at least partially mounted to the circuit board. Therefore, it is possible to maintain a high insulation capacity.

An electronic circuit device for fishing equipment according to a third aspect of the present invention is the electronic circuit device of the first or second aspect, in which the fishing equipment is a fishing reel that includes a reel unit and a spool that is rotatively mounted to the reel unit. Further, the circuit board is adapted to be mounted on a wall surface of the reel unit. With this configuration, superior insulation performance can be maintained while preventing the need to make the fishing equipment larger. Further, the external device connector can access with the external device.

An electronic circuit device for fishing equipment according to a fourth aspect of the present invention is the electronic circuit device of the third aspect, in which the fishing reel is a dual bearing reel that further includes magnets. The magnets are non-rotatably mounted to a rotation shaft of the spool, magnetic poles of the magnets differing in a rotational direction. The electronic circuit device further includes a plurality of coils that are mounted to the circuit board and adapted to be disposed around the magnets. Further, the microcomputer is adapted to brake the spool by controllably switching generation of electric power, the electric power being generated by rotation of the coils relative to the magnets. Here, the braking force applied to the spool can be electronically controlled.

An electronic circuit device for fishing equipment according to a fifth aspect of the present invention is the electronic circuit device of the fourth aspect, in which the spool includes a tubular bobbin portion around which fishing line is wound, and a pair of flange portions formed on both ends of the bobbin portion and which have diameters that are larger than the diameter of the bobbin portion. Further, the circuit board is a washer shaped board that is arranged to be concentric with the rotation shaft of the spool and face one of the flange portions. With this configuration, since a washer shaped circuit board having a round external shape is arranged to face a flange portion of the spool and to be concentric with the rotation shaft of the spool, the circuit board can be compactly arranged between the outer wall of the reel unit and a flange portion of the spool. Thus, enlargement of the reel can be prevented even further.

An electronic circuit device for fishing equipment according to a sixth aspect of the present invention is the electronic circuit device of any of first to fifth aspects, in which the electronic circuit is formed on both front and rear surfaces of the circuit board. Here, the electronic circuit device is compact because the electric components can be mounted on both sides of the circuit board.

An electronic circuit device for fishing equipment according to a seventh aspect of the present invention is the device of any of the first to sixth aspects, in which the external device connector is adapted to allow input and/or output data between the microcomputer and the external device. With this configuration, it is possible to transmit data from the external device to the microcomputer and transmit data from the microcomputer to the external device. It is also possible to communicate in one or both directions. Thus, the external device can be employed to check the state of the reel and modify the control details of the reel.

An electronic circuit device for fishing equipment according to an eighth aspect of the present invention is the electronic circuit device of any of the fourth to seventh aspects, in which data that are input from the external device via the external device connector include brake force setting data that set the brake force to be applied to the spool. With this configuration, the spool can be braked with a brake pattern that differs in response to the type of casting or lure used because the brake force setting data can be modified.

An electronic circuit device for fishing equipment according to a ninth aspect of the present invention is the electronic circuit device disclosed in any of the first to eighth aspects, in which the external device connector is adapted to receive from the external device data relating to the control program. With this configuration, the control program that operates the microcomputer can be easily upgraded because the control program can be updated.

An electronic circuit device for fishing equipment according to a tenth aspect of the present invention is the electronic circuit device of any of the first to sixth aspects, in which the external device connector can connect the external device that inspects the electronic circuit formed on the circuit board. With this configuration, the electronic circuit can be easily inspected without peeling off the insulating film because the insulating film is not formed on the external device connector.

An electronic circuit device for fishing equipment according to an eleventh aspect of the present invention is the electronic circuit device of any of the first to tenth aspects, in which the insulating film is formed by a hot melt molding method in which a resin material is injected into a mold into which the circuit board with the electric components mounted thereon is set. This allows an insulating film to be formed that has high dimensional accuracy and improved visual appearance.

An electronic circuit device for fishing equipment according to a twelfth aspect of the present invention is the electronic circuit device of any of the first to eleventh aspects, in which the external device connector includes a socket mounted on the circuit board, while the socket includes an input/output terminal electrically connected to the electronic circuit.

An electronic circuit device for fishing equipment according to a thirteenth aspect of the present invention is the electronic circuit device of any of the first to twelfth aspects, wherein the external device connector includes a socket that is exposed to an exterior of the fishing equipment. With this configuration, it is easy to connect an external device to the external device connector because the external device connector is disposed so that the external device connector can be exposed on the exterior of the fishing equipment.

An electronic circuit device for fishing equipment according to a fourteenth aspect of the present invention is the electronic circuit device of the thirteenth aspect, wherein the external device connector further includes a connector adapted to be connected to the external device and a cable that connects the socket with the connector.

An electronic circuit device for fishing equipment according to a fifteenth aspect of the present invention is the electronic circuit device of any of the first to fourteenth aspects, further including a detachable cap member coupled to the external device connector. With this configuration, insulation failure is unlikely to occur in the external device connector because the external device connector can be covered with the cap member when the external device is not connected to the external device connector.

An electronic circuit device for fishing equipment according to a sixteenth aspect of the present invention is the electronic circuit device of any of the first to fifteenth aspects, wherein the fishing equipment is a fishing data display.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
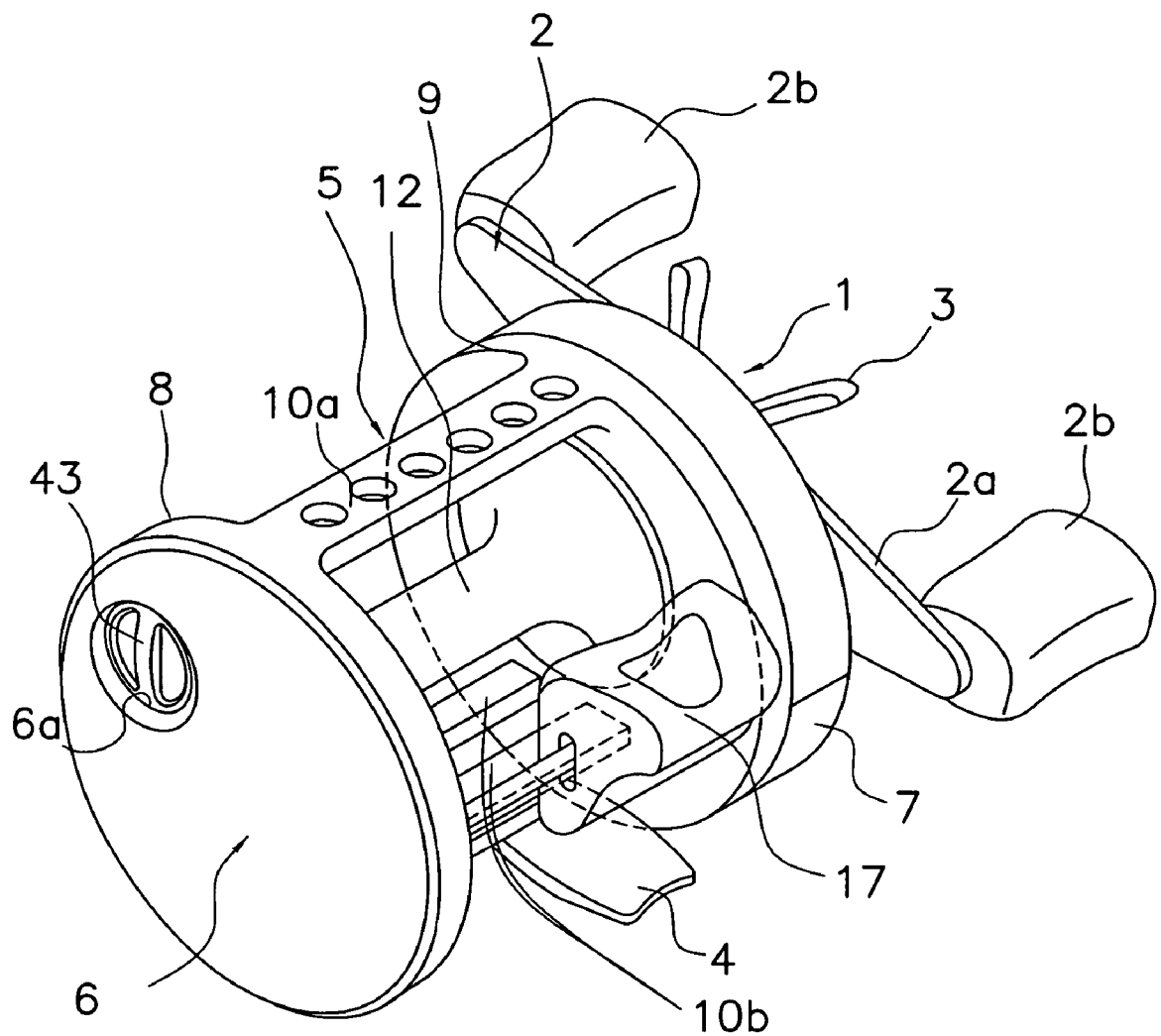
FIG. 1 is a perspective view of a dual-bearing reel in accordance with a preferred embodiment of the present invention.
Figure 2:
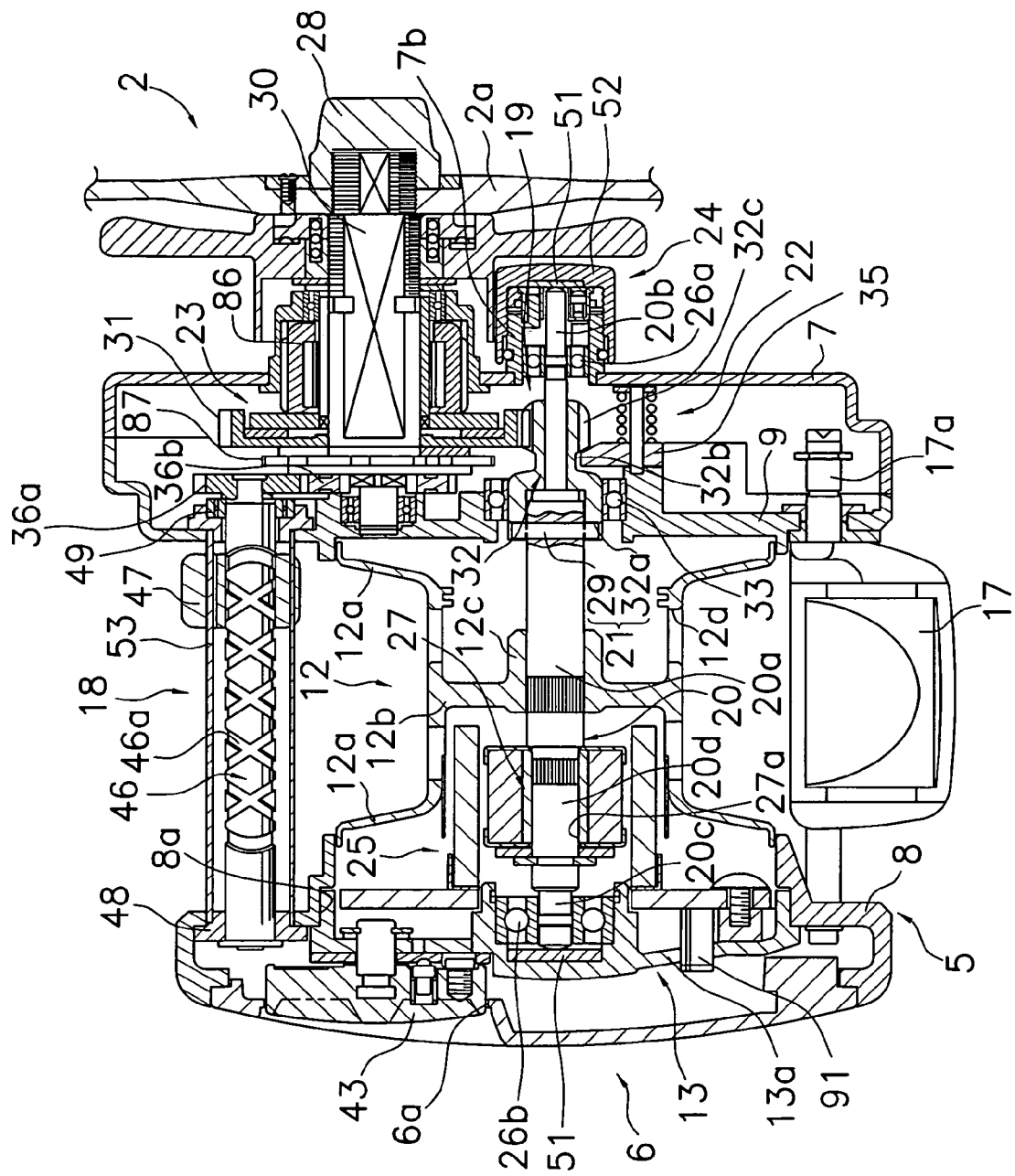
FIG. 2 is a plan cross-sectional view of the dual-bearing reel in accordance with the first embodiment of the present invention.

As shown in FIGS. 1 to 2, a dual bearing reel in accordance with a preferred embodiment of the present invention is a round dual-bearing reel for bait-casting. This reel includes a reel unit 1, a handle 2 rotatably supported by the reel unit 1, a star drag 3, and a spool 12. The handle 2 rotates a spool 12, and is disposed on a side of the reel unit 1. Further, the star drag 3 adjusts drag and is disposed on the same side of the reel unit 1 as the handle 2. The handle 2 is of the double-handle type and has a plate-shaped arm portion 2a and knobs 2b that are rotatively mounted to both ends of the arm portion 2a. As shown in FIG. 2, the arm portion 2a is non-rotatively mounted to the end of a handle shaft 30, and is fastened to the handle shaft 30 by a nut 28.

Reel Unit 1

Figure 6:
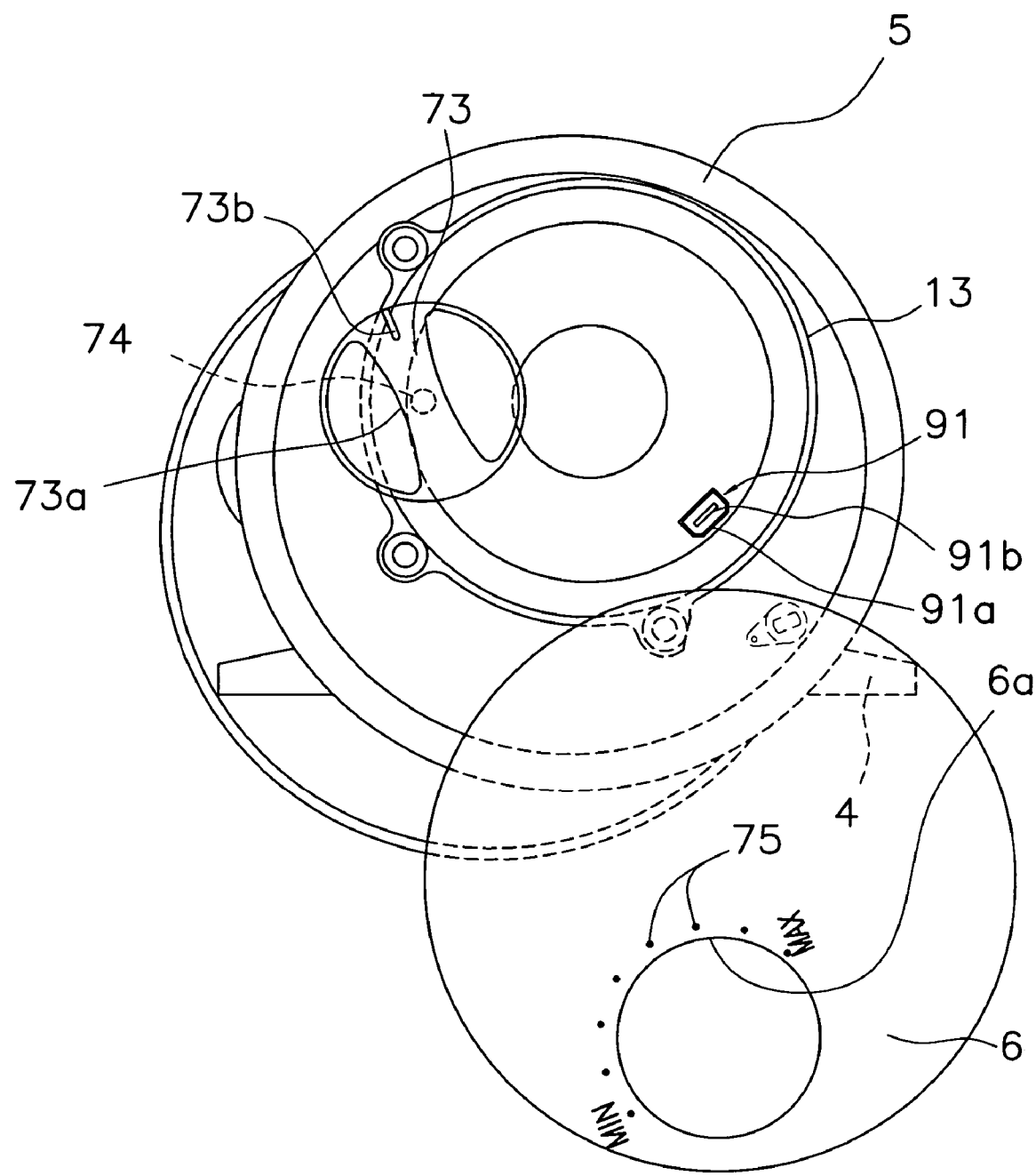
FIG. 6 is a right side elevational view of the dual-bearing reel in accordance with the first embodiment of the present invention.

The reel unit 1 is, for example, made of a metal such as an aluminum alloy or a magnesium alloy, and includes a frame 5, and a first side cover 6 and a second side cover 7 that are mounted to both sides of the frame 5. A spool 12 to wind fishing line is rotatively mounted on a spool shaft 20 (see FIG. 2) and supported by the reel unit 1. When viewed from the exterior in the spool shaft direction, the first side cover 6 is circular in shape, and the second side cover 7 is formed having two disks that intersect each other. As shown in FIG. 6, the first side cover 6 is mounted such that it can be opened and closed with respect to the frame 5. The first side cover 6 is supported on the frame 5 such that it rotates after being separated from the frame 5 in an outward axial direction during opening and closing.

As shown in FIG. 2, the spool 12, a clutch lever 17, and a level wind mechanism 18 are disposed inside the frame 5. The clutch lever 17 functions as a thumb rest when thumbing fishing line, and the level wind mechanism 18 uniformly winds fishing line around the spool 12. A gear mechanism 19, a clutch mechanism 21, a clutch control mechanism 22, a drag mechanism 23, and a casting control mechanism 24 are disposed in the space between the frame 5 and the second side cover 7. The gear mechanism 19 transmits rotational force from the handle 2 to the spool 12 and the level wind mechanism 18. The clutch control mechanism 22 controls the clutch mechanism 21 in accordance with the operation of the clutch lever 17. The drag mechanism 23 brakes the spool 12. The casting control mechanism 24 adjusts the resistance that occurs when the spool 12 rotates. In addition, an electrically controlled brake mechanism (an example of the braking device) 25 that prevents backlash when casting the fishing line is disposed between the frame 5 and the first side cover 6.

As shown in FIGS. 1 and 2, the frame 5 includes a pair of side plates 8 and 9 disposed to be opposite each other across a predetermined gap, and upper and lower connectors 10a and 10b (see FIG. 1) that unitarily connect the side plates 8 and 9. A circular opening 8a having a step is formed slightly above the center of the side plate 8. A spool support portion 13 that forms a portion of the reel unit 1 is screwed into the opening 8a.

Figure 3:
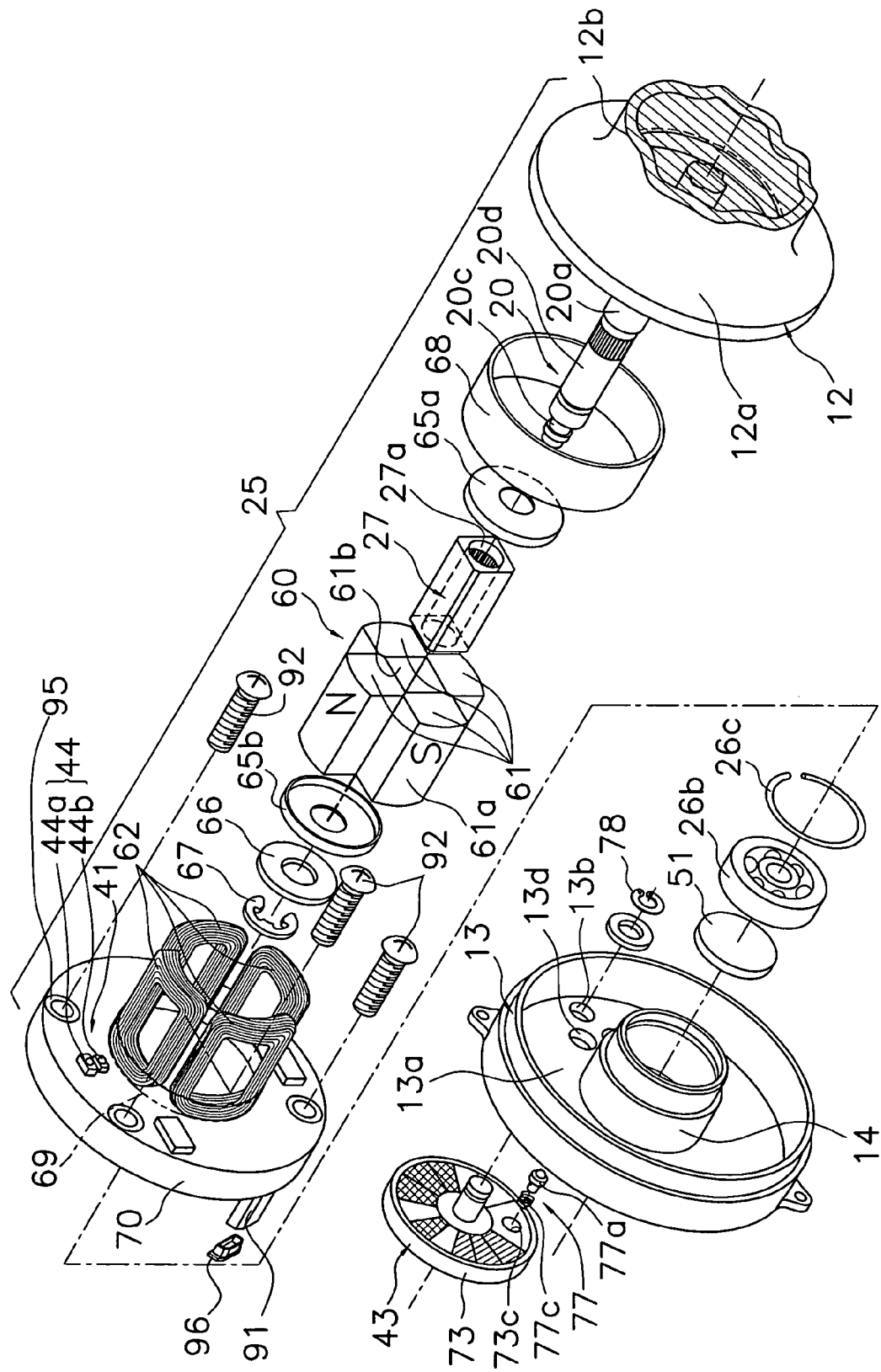
FIG. 3 is an exploded perspective view of a spool brake mechanism of the dual-bearing reel in accordance with the first embodiment of the present invention.
Figure 4:
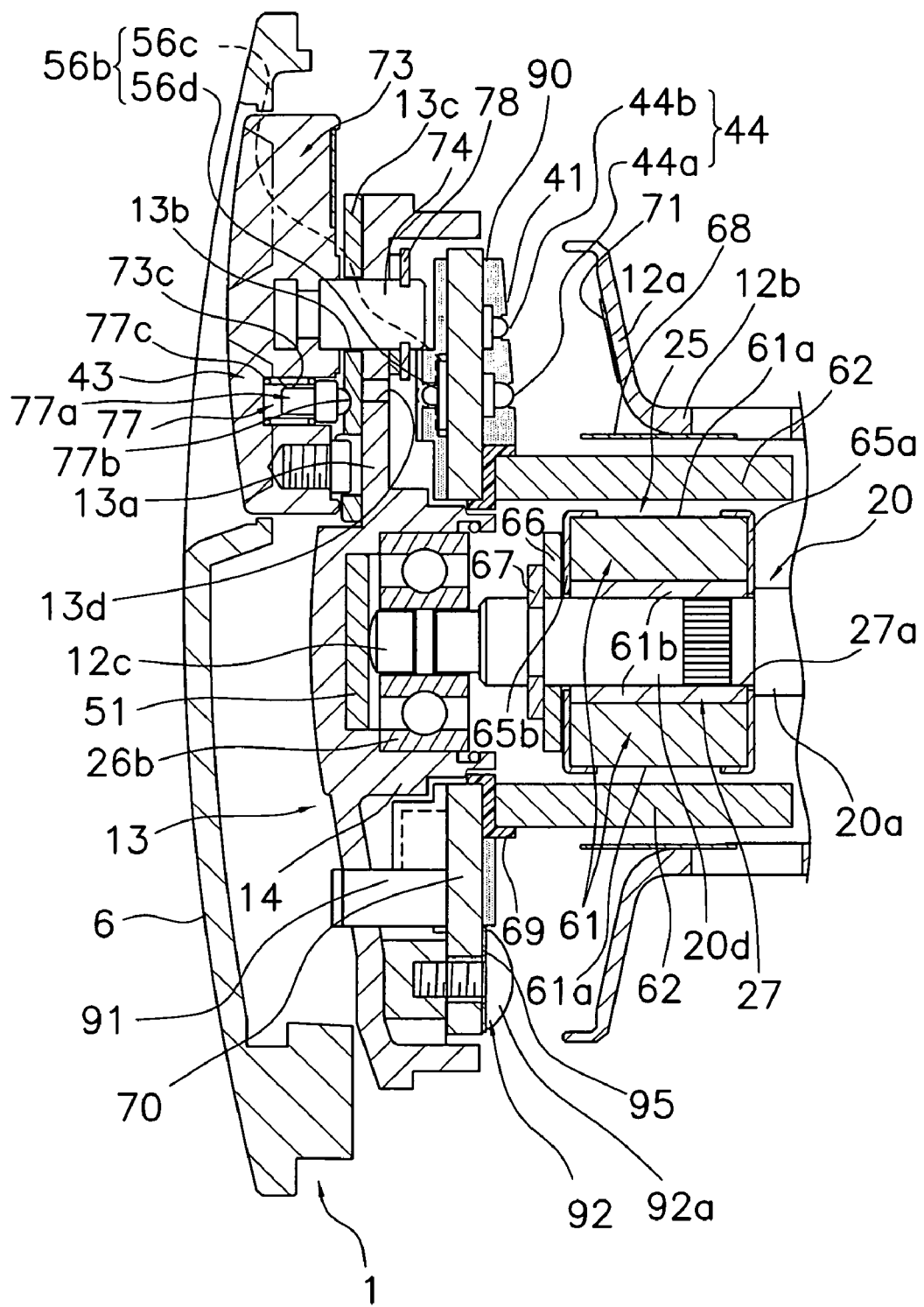
FIG. 4 is a magnified partial cross-sectional view of the spool brake mechanism in accordance with the first embodiment of the present invention.

As shown in FIGS. 3 and 4, the spool support portion 13 is a flat and approximately closed end tubular portion that is detachably mounted in the opening 8a. A tubular bearing accommodation portion 14 that projects inward is unitarily formed in the central portion of a wall portion 13a of the spool support portion 13. A bearing 26b that rotatively supports one end of the spool shaft 20 is disposed on the inner peripheral surface of the bearing accommodation portion 14. In addition, a friction plate 51 of the casting control mechanism 24 is mounted on the bottom of the bearing accommodation portion 14. The bearing 26b is engaged with the bearing accommodation portion 14 by a retaining ring 26c that is made of a wire material.

As shown in FIG. 1, the upper connecting portion 10a is mounted in the same plane as the perimeter of the side plates 8 and 9, and a pair of front and rear lower connecting portions 10b is disposed inwardly from the perimeter. A rod mounting leg 4 that is, for example, made of a metal such as an aluminum alloy and extends from front to rear is riveted to the lower connecting portions 10b, and mounts the reel to a fishing rod.

The first side cover 6 is screwed to the side plate 8 by screw members (not shown in the figures) that are inserted from the second side cover 7 side. A circular opening 6a in which a brake switch knob 43 (described below) is disposed is formed in the first side cover 6.

Spool 12

Figure 16:
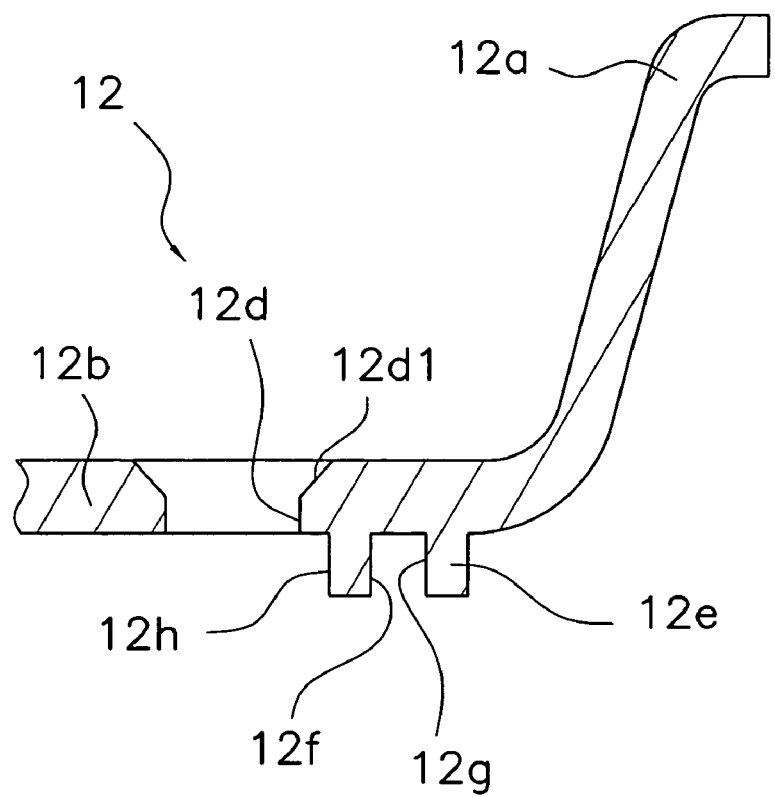
FIG. 16 is a partial cross-sectional view of a spool of the dual-bearing reel in accordance with the first embodiment of the present invention.
Figure 17:
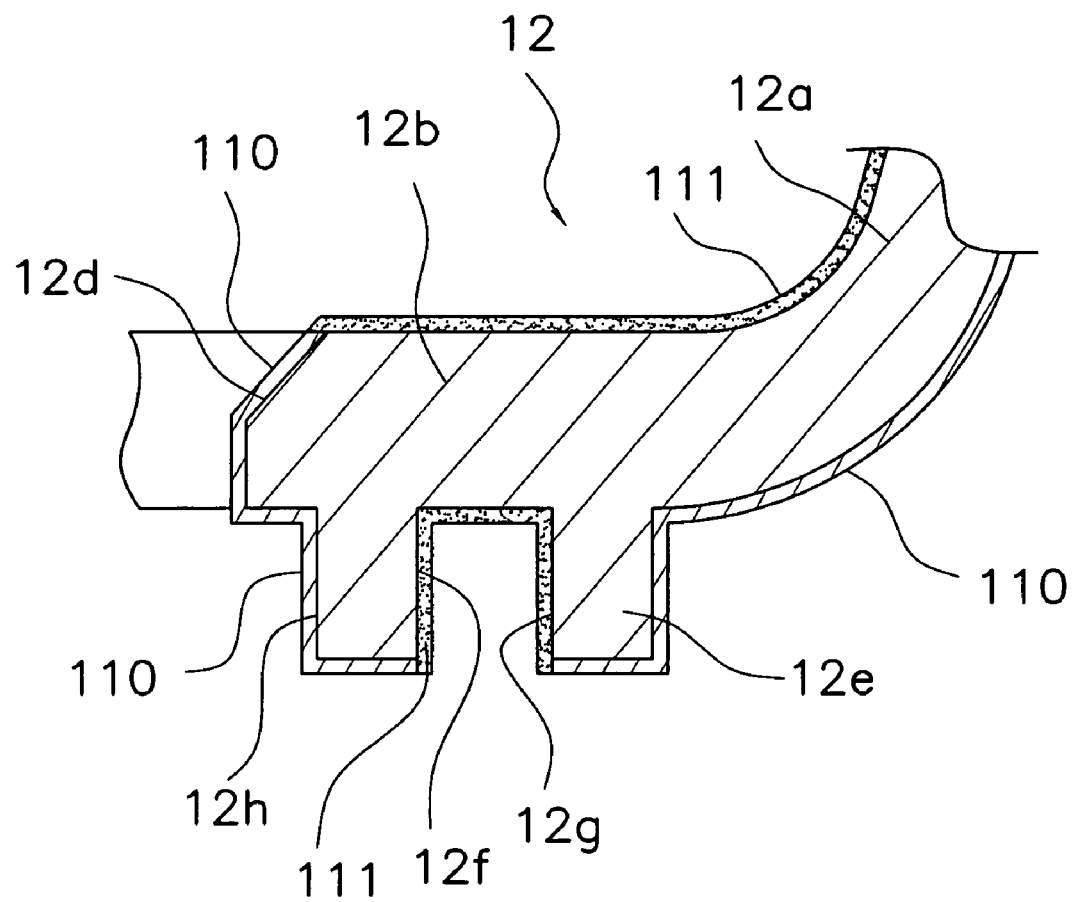
FIG. 17 is an alternate cross-sectional view of the spool in accordance with the first embodiment of the present invention, illustrating an outer layer.

As shown in FIGS. 2, 16, and 17, the spool 12 includes large diameter flange portions 12a that are arranged on both ends of the spool 12, a bobbin portion 12b, a boss portion 12c, through holes 12d, and an engagement portion 12e. The bobbin portion 12b is unitarily formed between the flange portions 12a. Fishing line is wound around the outer periphery of the bobbin portion 12b. The boss portion 12c is unitarily formed on an inner peripheral side of the bobbin portion 12b and non-rotatably and fixedly coupled to the spool shaft 20. The through holes 12d pass through the inner and outer peripheries of the bobbin portion 12b. The engagement portion 12e is formed on the opening side of the inner peripheral side of the bobbin portion 12b that faces the handle 2. The spool 12 is preferably made of an aluminum alloy, and has on its surface a first alumite layer 110 and a second alumite layer 111 (see FIG. 17) formed by a first alumite process and a second alumite process described below.

As shown in FIG. 2, the flange portions 12a are disk shaped members arranged with large diameters relative to and on both ends of the bobbin portion 12b. Further, the flange portions 12a are disposed between the first side plate 8 and the second side plate 9. As shown in FIG. 16, the flange portions 12a are continuously formed such that they smoothly rise from the outer periphery of both ends of the bobbin portion 12b. As shown in FIG. 2, the bobbin portion 12b is a tubular member around the outer periphery of which fishing line is wound. Both ends of the bobbin portion 12b are unitarily formed with the flange portions 12a. Further, the inner peripheral portion of the bobbin portion 12b is unitarily formed with the boss portion 12c. As shown in FIG. 2, the boss portion 12c is unitarily formed on the inner peripheral side of the bobbin portion 12b in the approximate central portion thereof. The inner peripheral portion of the boss portion 12c is formed to be comparatively thicker than the portion thereof that connects with the bobbin portion 12b. The spool shaft 20 passes through the inner peripheral portion of the boss portion 12c, and is fixedly coupled thereto by for example, a serrated coupling so that the spool shaft 20 cannot rotate relative to the boss portion 12c. The method of coupling the spool 20 to the boss portion 12c is not limited to serration coupling, and other coupling methods such as key coupling or spline coupling can be employed as well.

As shown in FIG. 2, the through holes 12d are formed in a plurality of positions along the circumferential direction of the bobbin portion 12b. As shown in FIG. 16, each through hole 12d is round and has a larger diameter stepped portion 12d1 formed in the outer peripheral side (upper side in FIG. 16) thereof.

Still referring to FIG. 16, the engagement portion 12e is formed to project annularly on the inner peripheral side of the bobbin portion 12b. The engagement portion 12e includes a slot 12f that is formed to have a slot shape so as to open toward the inner peripheral side of the engagement portion 12e, and an engagement surface 12g that is the surface that is opposite the opening of the slot 12f. The engagement surface 12g engages with an electrode of an alumite apparatus (not shown in the figures) when the second alumite process is performed (described below). In addition, a wall surface 12h that is on the opposite side of the opening of the engagement portion 12e engages with the electrode when the first alumite process is performed (described below).

As shown in FIG. 17, the inner peripheral surface of the flange portions 12a, the inner peripheral surface of the bobbin portion 12b (except for the slot 12f), the wall surfaces of the boss portion 12c, and the through holes 12d have the first alumite layer 110 formed thereon by the first alumite process. The outer peripheral surface of the flange portions 12a, the outer peripheral surface of the bobbin portion 12b, and the slot 12f of the engagement portion 12e have the second alumite layer 111 formed thereon by the second alumite process. Note that the first alumite layer 110 and the second alumite layer 111 have different colors, with for example the first alumite layer 110 being silver and the second alumite layer 111 being gold. Here, it will be difficult for the color of the first alumite layer 110 to effect the color of the second alumite layer 111 because the gold colored second alumite layer 111 is formed after the silver colored first alumite layer 110 is formed.

Next, the steps in the alumite process of the spool 12 will be described in detail while referring to FIGS. 18 and 19.

Figure 18:
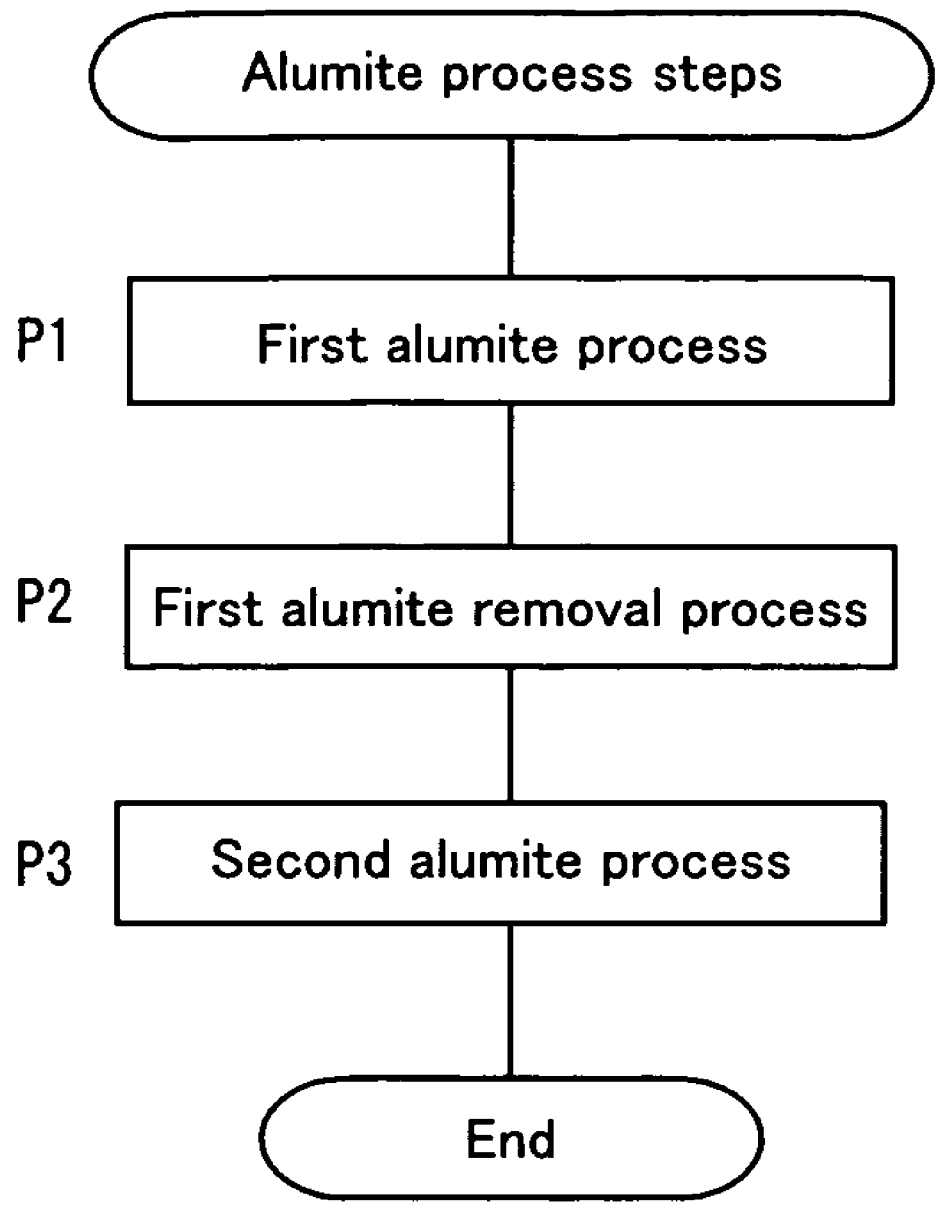
FIG. 18 is a view of a flowchart explaining a process to form the outer layer of the spool in accordance with the first embodiment of the present invention.
Figure 19:
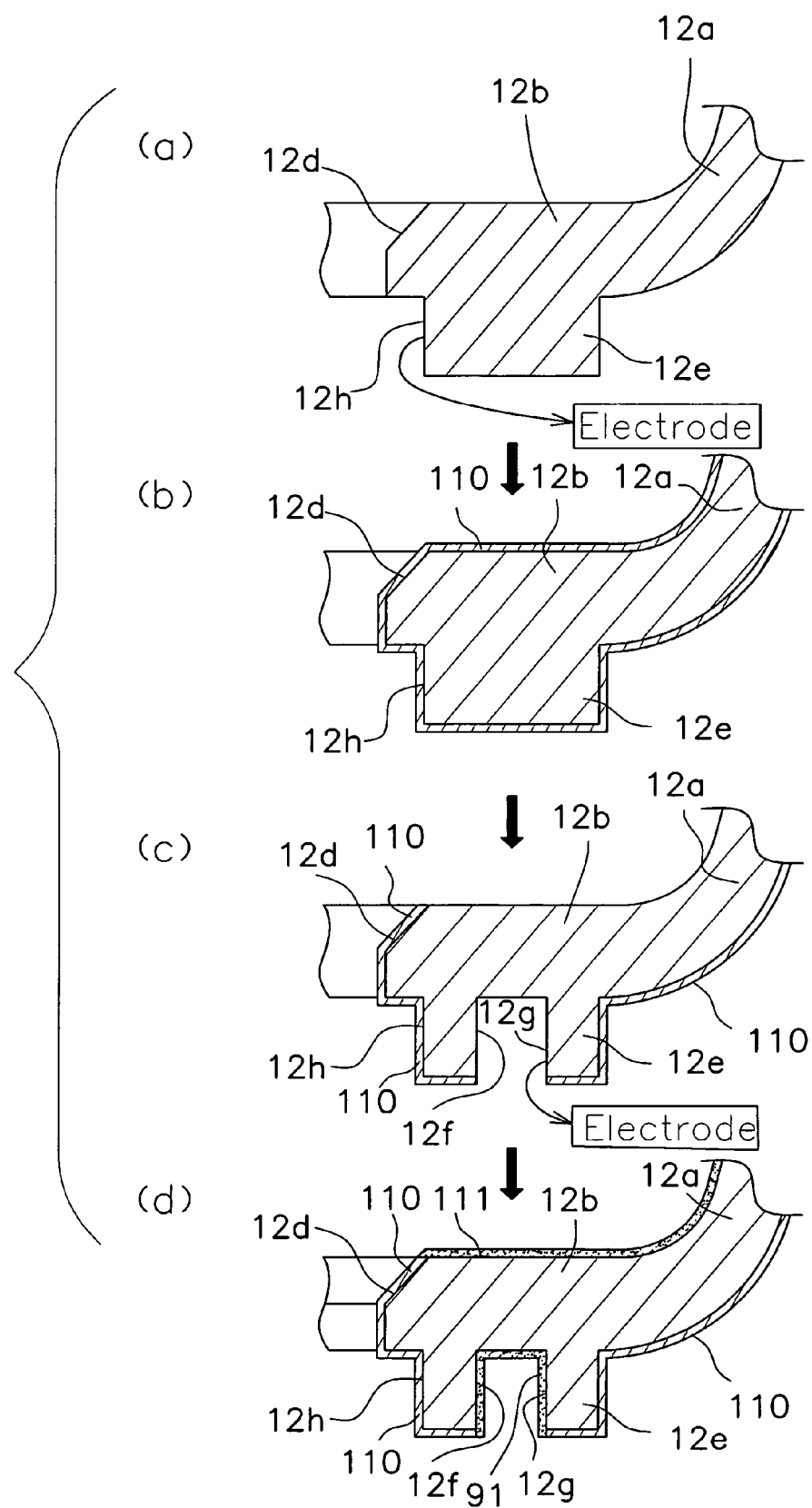
FIG. 19 is a partial cross-sectional view of the spool in accordance with the first embodiment of the present invention, depicting the process of forming the outer layer.

In Step P1 of the alumite process of the spool 12 shown in FIG. 18, a first alumite process step that forms the first alumite layer 110 is carried out. Here, as shown in FIG. 19(a), a positive electrode is engaged with the wall surface 12h on the opposite side of the opening of the engagement portion 12e, and when the spool 12 is immersed in an electrolytic solution of sulfuric acid or the like and subjected to electrolysis with a DC current, the first alumite layer 110 will be formed on the entire surface of the spool 12 as shown in FIG. 19(b).

Next, in Step P2 of FIG. 18, a first alumite removal process step is conducted that partially removes the first alumite layer 110. The first alumite layer 110 on the outer peripheral surfaces of the flange portions 12a and outer peripheral surface of the bobbin portion 12b are removed by a lathe or the like. The removal of the first alumite layer 110 and the formation of the slot 12*f* in the engagement portion 12*e* by a cutting process occurs simultaneously. Note that, as shown in FIG. 19(*c*), the first alumite layer 110 is left as is on the inner peripheral surfaces of the flange portions 12*a*, the inner peripheral surface of the bobbin portion 12*b*, and the wall surfaces of the through holes 12*d*.

Then, in Step P3 of FIG. 18, a second alumite process step that forms the second alumite layer 111 is carried out. Here, as shown in FIG. 19(*c*), a positive electrode is engaged with the engagement surface 12*g* of the engagement portion 12*e*, and when the spool 12 is immersed in an electrolytic solution of sulfuric acid or the like and subjected to electrolysis with a DC current, the second alumite layer 111 will be formed on the outer peripheral surfaces of the flange portion 12*a*, the outer peripheral surface of the bobbin portion 12*b*, and the surface of the slot 12*f* of the engagement portion 12*e* as shown in FIG. 19(*d*). The second alumite layer 111 is formed because the outer peripheral surfaces of the flange portions 12*a*, the outer peripheral surface of the bobbin portion 12*b*, and the surface of the slot 12*f* of the engagement portion 12*e* are made of an aluminum alloy and thus are conductive bodies. Further, the second alumite layer 111 is not formed on the inner peripheral surfaces of the flange portions 12*a*, the inner peripheral surface of the bobbin portion 12*b*, and the wall surfaces of the boss portion 12*c* and the though holes 12*d* on which the first alumite layer 110 is formed because these are not conductive bodies.

Thus, as shown in FIG. 17, the first alumite layer 110 is formed on the inner peripheral surfaces of the flange portions 12*a*, the inner peripheral surface of the bobbin portion 12*b*, the wall surfaces of the boss portion 12*c*, and the though holes 12*d*. Further, the second alumite layer 111 is formed on the outer peripheral surfaces of the flange portions 12*a*, the outer peripheral surface of the bobbin portion 12*b*, and the surface of the slot 12*f* of the engagement portion 12*e*.

Referring again to FIG. 2, the spool shaft 20 is made of a non-magnetic metal such as, for example, SUS 304, and passes through the side plate 9 and extends beyond the second side cover 7. The end of the spool shaft 20 that extends beyond the second side cover 7 in the direction of the handle 2 is rotatively supported on a boss 7*b* mounted on the second side cover 7 by a bearing 26*a*. In addition, the other end of the spool shaft 20 is rotatively supported by the bearing 26*b* as described above. A large diameter portion 20*a* is formed in the center of the spool shaft 20. Further, small diameter portions 20*b* and 20*c* that are supported by the bearings 26*a* and 26*b* are formed on both ends of the spool shaft 20. Note that the bearings 26*a* and 26*b* are, for example preferably made of SUS 440C that has been coated with a corrosion resistant film.

Furthermore, a magnet mounting portion 20*d* that mounts a magnet 61 (described below) is formed between the small diameter portion 20*c* and the large diameter portion 20*a* on the left side in FIG. 2, and has an outer diameter that is larger than the small diameter portion 20*c* and smaller than the large diameter portion 20*a*. A magnet retaining portion 27 is non-rotatably and fixedly coupled to the magnet mounting portion 20*d* by serration coupling, for example, and is a magnetic material formed by electroless plating nickel onto the surface of an iron material such as SUM (extruded and cut). The magnet retaining portion 27 is a rectangular member having a through hole 27*a* formed therein and is square shaped when viewed in cross-section. Further, the magnet mounting member 20*d* passes through the center of the magnetic retaining portion 27. The method of attaching the magnet retaining member 27 is not limited to serration coupling, and other coupling methods such as key coupling or spline coupling can be employed as well.

The right end of the large diameter portion 20*a* of the spool shaft 20 is disposed at a pass through portion of the side plate 9, and an engagement pin 29 that forms a part of the clutch mechanism 21 is fixedly coupled at this location. The engagement pin 29 passes through the large diameter portion 20*a* along its diameter and projects outward from both sides in the radial direction.

As shown in FIG. 2, the clutch lever 17 is disposed to the rear of the spool 12 and between the rear portions of the pair of side plates 8 and 9. The clutch lever 17 slides vertically between the side plates 8 and 9. An engagement shaft 17*a* is unitarily formed with the clutch lever 17 on the side of the clutch lever 17 where the handle 2 is mounted, and passes through the side plate 9. The engagement shaft 17*a* is engaged with the clutch control mechanism 22.

As shown in FIG. 2, the level wind mechanism 18 is disposed between the two side plates 8 and 9 in front of the spool 12. The level wind mechanism 18 includes a threaded shaft 46 on whose outer peripheral surface are formed intersecting helical grooves 46*a*, and a fishing line guide portion 47 which reciprocally moves back and forth on and relative to the threaded shaft 46 in the spool shaft direction. The two ends of the threaded shaft 46 are rotatively supported by shaft support portions 48 and 49 mounted on the side plates 8 and 9. A gear member 36*a* is mounted on the right end of the threaded shaft 46 in FIG. 2, and the gear member 36*a* meshes with a gear member 36*b* that is non-rotatively mounted on the handle shaft 30. With this configuration, the threaded shaft 46 rotates in association with the rotation of the handle shaft 30 in the line winding direction.

The fishing line guide portion 47 is disposed around the periphery of threaded shaft 46, and is guided in the spool shaft 20 direction by a pipe member 53 and a guide shaft (not shown in the figures). A portion of the pipe member 53 is cut away over its entire axial length, and the guide shaft is disposed above the threaded shaft 46. An engagement member (not shown in the figures) which engages with the helical grooves 46*a* is rotatively mounted on the fishing line guide portion 47 and reciprocally moves back and forth in the spool shaft direction via the rotation of the spool shaft 46. Level wind mechanisms are well-known in the art. Therefore, the structure and function of the level wind mechanism 18 will not be explained in further detail herein.

The gear mechanism 19 includes a handle shaft 30, a main gear 31 fixedly coupled to the handle shaft 30, and a tubular pinion gear 32 that meshes with the main gear 31. The handle shaft 30 is rotatively mounted on the side plate 9 and the second side cover 7, and prohibited from rotating in the line releasing direction by a roller-type one-way clutch 86 and a ratchet-type one way clutch 87. The one touch clutch 86 is mounted between the second side cover 7 and the handle shaft 30. The main gear 31 is rotatively mounted on the handle shaft 30, and is coupled to the handle shaft 30 via the drag mechanism 23.

The pinion gear 32 extends from outside of the side plate 9 to the inside thereof, is a tubular member through which the spool shaft 20 passes, and is mounted on the spool shaft 20 so that it is movable in the axial direction. In addition, the left side of the pinion gear 32 in FIG. 2 is rotatively and movably supported in the axial direction on the side plate 9 by a bearing 33. A meshing groove 32*a* that meshes with the engagement pin 29 is formed in the left end of the pinion gear 32 in FIG. 2. The meshing groove 32*a* and the engagement pin 29 form the clutch mechanism 21. In addition, a constricted portion 32b is formed in the central portion of the pinion gear 32. Further, a gear portion 32c that meshes with the main gear 31 is formed on the right end of the pinion gear 32. Gear mechanisms are well-known in the art. Therefore, the structure and function of the gear mechanism 19 will not be explained in further detail herein.

The clutch control mechanism 22 includes a clutch yoke 35 that engages with the constricted portion 32b of the pinion gear 32 and moves the pinion gear 32 along the spool shaft 20 direction. In addition, the clutch control mechanism 22 also includes a clutch return mechanism (not shown in the figures) which activates the clutch mechanism 21 when the spool 12 rotates in the line winding direction. Clutch control mechanisms are well-known in the art. Therefore, the structure and function of the clutch control mechanism 22 will not be explained in further detail herein.

The casting control mechanism 24 includes a plurality of friction plates 51 and a braking cap 52. The friction plates 51 are disposed on both ends of the spool shaft 20. The braking cap 52 is used to adjust the force with which the friction plates 51 are pressed against the spool shaft 20. The left friction plate 51 is mounted inside the spool support portion 13. Casting control mechanisms are well-known in the art. Therefore, the structure and function of the casting control mechanism 24 will not be explained in further detail herein.

Configuration of the Spool Brake Mechanism 25

Figure 8:
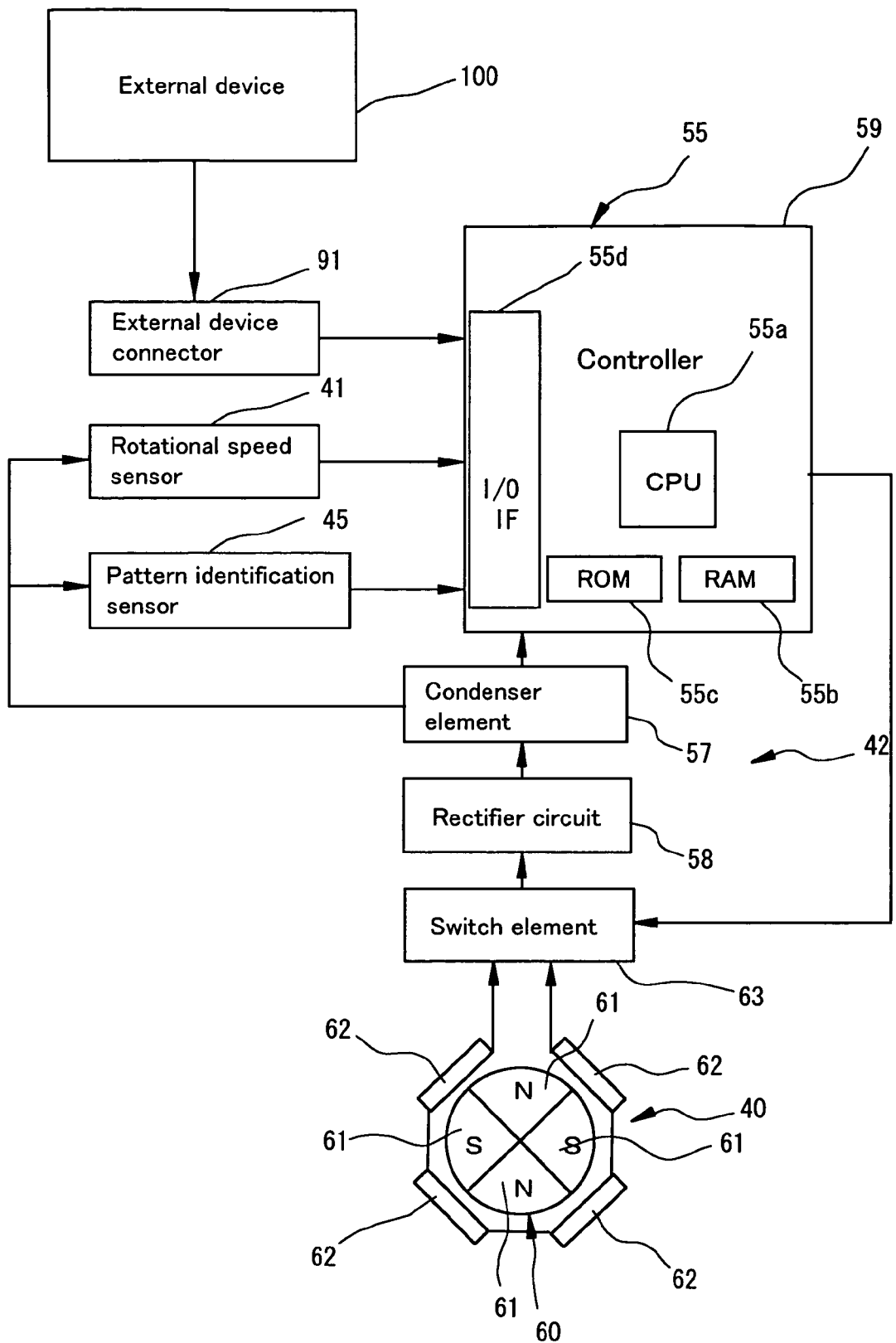
FIG. 8 is a view of a control block diagram of the spool brake mechanism in accordance with the first embodiment of the present invention.

As shown in FIGS. 3, 4, and 8, the spool brake mechanism 25 includes a spool brake unit 40, a rotational speed sensor 41, a spool control unit 42, and the brake switch knob 43. The spool brake unit 40 is arranged between the spool 12 and the reel unit 1. The rotational speed sensor 41 detects tension that is applied to the fishing line. The spool control unit 42 electrically controls the spool brake unit 40 with any one of eight braking modes, and the brake switch knob 43 is used to select one of the eight braking modes.

The spool brake unit 40 is electrically controlled to brake the spool 12 by the spool control unit 42 through generation of electricity. The spool brake unit 40 is composed of a rotor 60 having 4 magnets 61 disposed around the spool shaft 20 in the rotational direction, four coils 62 disposed opposite the outer peripheral sides of the rotor 60 and serially connected to each other, and a switch element 63 to which both ends of the plurality of serially connected coils 62 are connected. The spool brake unit 40 and the spool control unit 42 controllably brake the spool 12 by controllably switching on and off the flow of electricity generated through the relative rotation between the magnets 61 and the coil 62 by the switch element 63. The braking force generated by the spool brake unit 40 will increase in accordance with the length of time the switch element 63 is activated.

The four magnets 61 of the rotor 60 are disposed side by side in the circumferential direction, and the polarities of the magnets 61 are sequentially different. The magnets 61 have approximately the same length as that of the magnet retaining portion 27. Outer surfaces 61a of the magnets 61 are arc-shaped in cross-section, and inner surfaces 61b thereof are planar. The inner surfaces 61b are disposed so that they are in contact with the outer peripheral surfaces of the magnet retaining portion 27 of the spool shaft 20. Both ends of the magnets 61 are interposed between disk-shaped and plate-shaped cap members 65a and 65b. The disk-shaped and plate-shaped cap members 65a and 65b are preferably made of a non-magnetic metal such as, for example, SUS 304. Further, the cap members 65a and 65b are non-rotatably mounted to the magnet retaining portion 27 with respect to the spool shaft 20. Since the magnets 61 are retained by the cap members 65a and 65b that are made from a non-magnetic metal, the assembly of the magnets 61 onto the spool shaft 20 can be made easier without weakening the magnetic force of the magnets 61, and also the comparative strength of the magnets 61 after assembly is increased.

The distance between the left end surface of the magnets 61 in FIG. 4 and the bearing 26b is 2.5 mm or greater. The cap member 65a on the right side of FIG. 4 is interposed between the step that separates the large diameter portion 20a of the spool shaft 20 and the magnet mounting portion 20d and the magnet retaining portion 27, which limits the rightward movement of the cap member 65a.

A washer member 66 is mounted to the left side of the cap member 65b and disposed between the cap member 65b and the bearing 26b. The washer member 66 is made from a magnetic material formed by electroless nickel plating the surface of an iron material such as SPCC (plate). The washer member 66 is retained by, for example, an e-shaped retaining ring 67 that is mounted to the spool shaft 20. The washer member 66 has a thickness between 0.5 mm and 2 mm, and the outer diameter thereof is between 60% and 120% of the outer diameter of the bearing 26b. It will be difficult for the bearing 26b disposed near the magnets 61 to become magnetized due to the arrangement of the magnetic washer 66. Given this structure, it will be difficult for the magnets 61 to have an impact on the ability of the spool 12 to rotate when the spool 12 is freely rotating, even if the magnets 61 are disposed near the bearing 26b. In addition, it will also be difficult for the bearing 26b to become magnetized because the distance between the magnets 61 and the bearing 26b is 2.5 mm or greater.

A sleeve 68 is mounted on the inner peripheral surface of the bobbin 12b in a position that faces the magnets 61, and is made from a magnetic material formed by electroless nickel plating the surface of an iron material such as SUM (extruded and cut material). The sleeve 68 is fixedly attached to the inner peripheral surface of the bobbin 12b by a suitable fixing method or apparatus such as press fitting or adhesive. When this type of magnetic sleeve 68 is disposed opposite the magnets 61, electrical generation and brake efficiency are increased because magnetic flux from the magnets 61 converge on and pass through the coils 62.

The coils 62 are the coreless type, which are arranged to prevent cogging and make the rotation of the spool 12 smooth. Furthermore, a yoke is not provided. The coils 62 are wound into approximate rectangular shapes so that the wrapped core wires face the magnets 61 and are disposed inside the magnetic fields of the magnets 61. The four coils 62 are serially connected, and both ends thereof are connected to the switch element 63. The coils 62 are curved along the rotational direction of the spool 12 into arc-shapes that are substantially concentric with respect to the spool shaft 20 so that the distance between the outer surfaces 61a of the magnets 61 and the coils 62 is approximately uniform. Given this structure, the gap between the coils 62 and the magnets 61 during rotation can be uniformly maintained. The four coils 62 are, for example, held in place by a disk-shaped and plate-shaped coil holder 69 that includes a brim made of a synthetic resin. Further, the surfaces of the coils 62 are covered by an insulating film such as a varnish or the like. The coil holder 69 is fixedly attached to a circuit board 70 (described below) that forms the spool control unit 42. Note that in FIG. 3, the coil holder 69 is illustrated with dashed lines in order to show the coils 62. Thus, the four coils 62 are easily mounted to the circuit board 70 because the coils 62 are mounted on the coil holder 69 made of a synthetic resin, and the magnetic flux from the magnets 61 will not be disturbed because the coil holder 69 is made from a synthetic resin.

The switch element 63 includes, for example, two parallel connected FET (field effect transistors) 63*a* that can switch on and off at a high speed. The serially connected coils 62 are connected to each drain terminal of the FET 63*a*. As shown in FIG. 5B, the switch element 63 is mounted to the rear surface of the circuit board 70, the surface opposite the front surface that faces the flange portions 12*a*.

Referring again to FIGS. 3, 4, and 8, the rotational speed sensor 41 employs, for example, a reflection type electro-optical sensor 44 that includes a light portion 44*a* and a receptor portion 44*b*, and is disposed on the front surface of the circuit board 70 that faces the flange portions 12*a* of the spool 12. A read-out pattern 71 is formed on the outer side surface of the flange portion 12*a* by a suitable method such as printing, applying a sticker, or attaching a reflective plate. The read-out pattern 71 reflects light illuminated from the light portion 44*a*. Signals from the receptor portion 44*b* of the rotational speed sensor 41 allow the rotational speed of the spool 12 to be detected so that tension can be applied to the fishing line.

Figure 7:
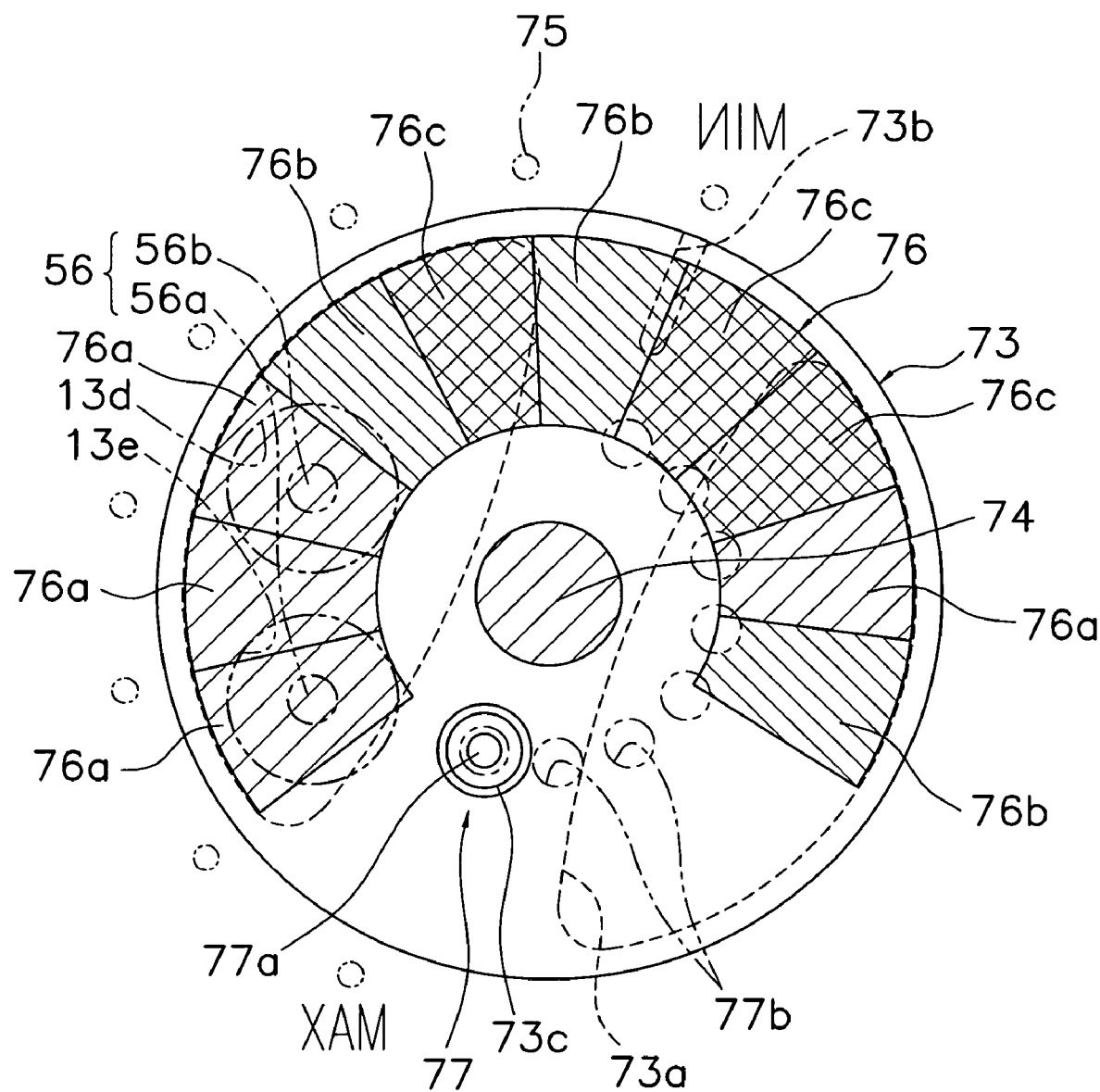
FIG. 7 is a rear side view of a brake switch knob of the spool brake mechanism in accordance with the first embodiment of the present invention.

The brake switch knob 43 is provided so that the braking mode can be set to any one of 8 levels. As shown in FIGS. 4, 6, and 7, the brake switch knob 43 is rotatively mounted to the spool support portion 13. The brake switch knob 43 includes, for example, a disk-shaped knob unit 73 that is preferably made of a synthetic resin, and a rotation shaft 74 that is preferably made of metal and positioned in the center of the knob unit 73. The rotation shaft 74 and the knob unit 73 are formed as a unitary unit by insert molding. A knob portion 73*a* that is convex is formed on the outer surface of the knob unit 73 that is exposed in the opening 6*a*. The perimeter of the knob portion 73*a* is concave in shape, which makes the brake switch knob 43 easy to operate.

An indicator 73*b* is formed in one end of the knob portion 73*a* so as to be slightly concave. Eight marks 75 that face the indicator 73*b* are formed with a uniform spacing around the perimeter of the opening 6*a* in the first cover 6 by a suitable method such as printing or applying a sticker. Any braking mode can be selected and set by rotating the brake switch knob 43 and aligning the indicator 73*b* with one of the marks 75. In addition, an identification pattern 76 is formed with a uniform spacing on the back surface of the knob unit 73 by a suitable method such as printing or applying a sticker, and serves to allow the detection of the rotational position of the brake switch knob 43, i.e., to identify which of any of the braking modes is selected. The identification pattern 76 includes three types of 10 fan-shaped first to third patterns 76*a*, 76*b*, and 76*c* in the rotational direction. The first pattern 76*a* is illustrated with hatching as shown on the lower left portion of FIG. 7, and is for example a mirrored surface that reflects light. The second pattern 76*b* is illustrated with hatching as shown on the lower right portion of FIG. 7, and is for example a pattern that is black and thus hardly reflects light. The third pattern 76*c* is illustrated with cross-hatching as shown in FIG. 7, and is for example a gray pattern that reflects only approximately half of the light. Which of any of the 8 levels of braking mode is selected can be identified by the combination of these three types of patterns 76*a*–76*c*. Note that if one of the patterns 76*a*–76*c* is the same color as the knob unit 73, then the back surface of the knob unit 73 may be used as is and a separate pattern need not be formed thereon.

The rotation shaft 74 is mounted in a through hole 13*b* formed in the wall portion 13*a* of the spool support portion 13, and is engaged with the wall portion 13*a* by a retaining ring 78.

A positioning mechanism 77 is provided between the knob unit 73 and the outer surface of the wall portion 13*a* of the spool support portion 13. The positioning mechanism 77 positions the brake switch knob 43 at one of the 8 levels that correspond to the braking mode, and generates sounds when the brake switch knob 43 is rotated. The positioning mechanism 77 includes a positioning pin 77*a*, eight positioning holes 77*b*, and an urging member 77*c*. The positioning pin 77*a* is mounted in a recessed portion 73*c* formed in the back surface of the knob unit 73. The positioning holes 77*b* engage with the tip of the positioning pin 77*a*. The urging member 77*c* urges the positioning pin 77*a* toward the positioning holes 77*b*. The positioning pin 77*a* is a rod shaped member that includes a small diameter head portion, a brim portion having a diameter that is larger than the head portion, and a small diameter shaft portion. The head portion is formed into a hemispherical shape. The positioning pin 77*a* is mounted in the recessed portion 73*c* so that it can both project outward and retract inward. The eight positioning holes 77*b* are formed spaced apart in the circumferential direction on a fan-shaped auxiliary member 13*c* that is fixedly attached around the periphery of the through hole 13*b* in the outer surface of the wall portion 13*a* of the spool support portion 13. The positioning holes 77*b* are formed so that the indicator 73*b* will align with any of the eight marks 75.

Spool Control Unit 42

Figure 5A:
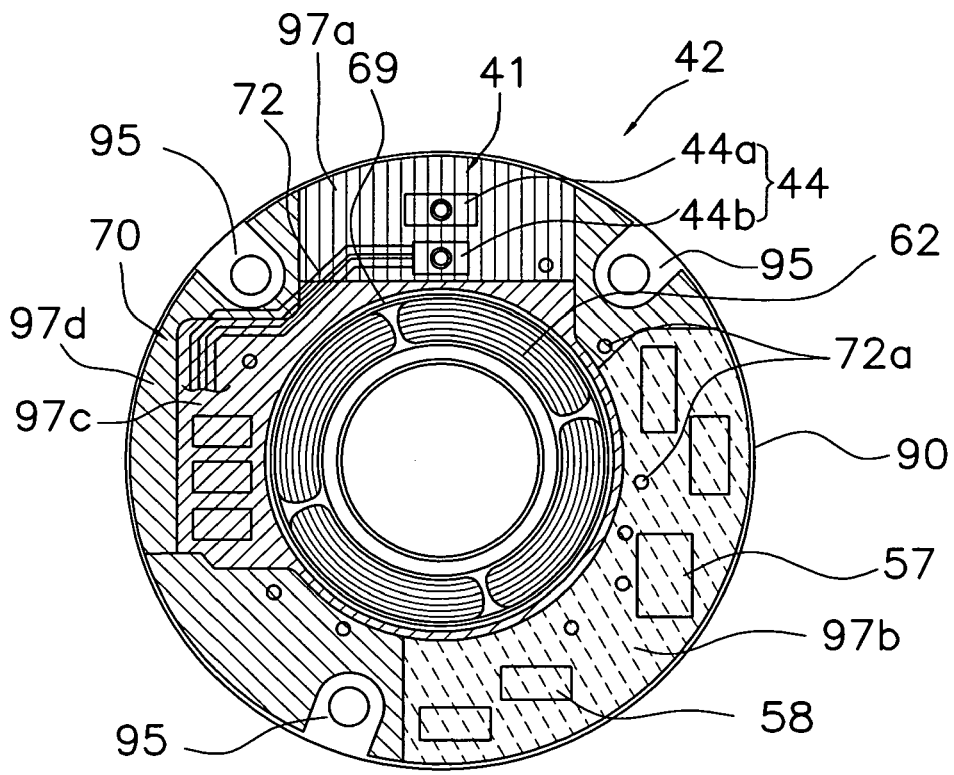
FIG. 5A is an elevational view of the disposition of components on a circuit board of the spool brake mechanism in accordance with the first embodiment of the present invention.
Figure 5B:
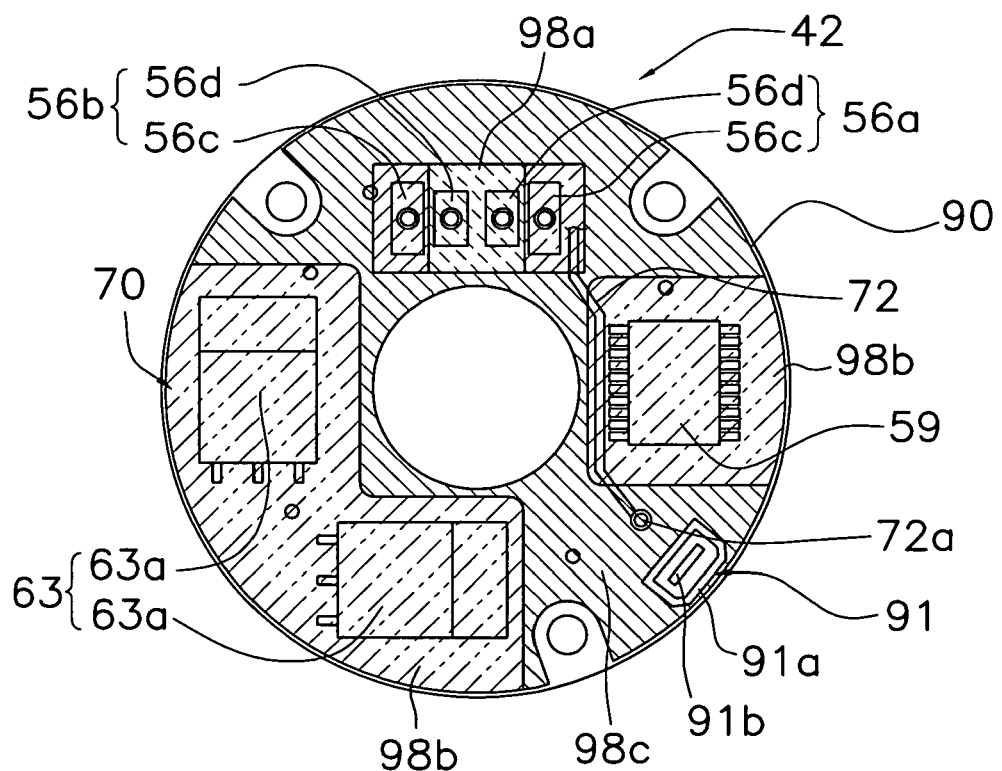
FIG. 5B is a rear elevational view of the disposition of components on the circuit board in accordance with the first embodiment of the present invention.

As seen in FIGS. 4, 5A and 5B, the spool control unit (an example of the electronic circuit device) 42 includes the circuit board 70 that is mounted to the outer wall surface of the spool support portion 13 that faces the flange portion 12*a* of the spool 12, a controller 55 that is provided on the circuit board 70, an external device connector 91 disposed on the circuit board 70, and an insulating film 90 that covers the circuit board 70 except where the external device connector 91 is disposed. The circuit board 70 is a washer-shaped and ring-shaped substrate having a circular opening in the center thereof, and is disposed on the outer peripheral side of the bearing accommodation portion 14 so as to be substantially concentric with the spool shaft 20. As shown in FIGS. 5A and 5B, the circuit board 70 includes printed circuits 72 both on the front surface thereof on which the coils 62 are mounted and on the rear surface thereof. Note that only a portion of the printed circuits 72 are shown in FIGS. 5A and 5B. Portions of the printed circuits 72 on the front and rear surfaces of the circuit board 70 are electrically connected via through holes 72*a*. Referring to FIGS. 5A, 5B, and 8, the external device connector 91 to connect an external device 100 is arranged on the outer peripheral side of the circuit board 70. The external device 100, for example, determines whether or not a control program is operating correctly, upgrades software, changes control patterns by changing software settings, and the like. The external device connector 91 includes a socket 91*a* that can input data to and output data from the external device 100 and includes a plurality of input/output terminals 91*b* such as for example Universal Serial Buses that are capable of being connected to the external device 100. The socket 91*a* is mounted on the circuit board 70, and includes an input/output terminal 91*b* that is electrically connected to the printed circuit 72. The base end of the external device connector 91 is mounted on the circuit board 70, and the tip of the external device connector 91 passes through the spool support portion 13.

Thus, as shown in FIG. 6, when the first side cover 6 is open, the input/output terminals 91b of the external device connector 91 are exposed to the exterior and the external device 100 can be connected thereto. As seen in FIG. 3, a cap member 96 is mounted on the tip of the external device connector 91. The cap member 96 is provided in order to waterproof the input/output terminals 91b of the external device connector 91. Note that in FIG. 6 the external device connector 91 is illustrated with the cap member 96 removed.

Referring to FIGS. 3 and 4, the circuit board 70 is fixedly attached to the inner side surface of the wall portion 13a of the spool support portion 13 by three screws 92. When the circuit board 70 is to be attached to the spool support portion 13 with the screws 92, then, for example, a jig that is temporarily positioned on the bearing accommodation portion 14 is used to center the circuit board 70, and the circuit board 70 is then disposed so that the circuit board 70 is substantially concentric with respect to the spool shaft 20. In this way, when the circuit board 70 is mounted to the spool support portion 13, the coils 62 attached to the circuit board 70 will be disposed so that they are substantially concentric with the spool shaft 20.

Here, the dimensions of the reel unit 1 in the spool shaft direction can be made smaller than when the circuit board 70 is mounted in a space between the reel unit 1 and the first side cover 6 because the circuit board 70 is mounted to the opened wall surface 13a of the spool support portion 13 that forms the reel unit 1. This allows the overall size of the reel unit 1 to be reduced. In addition, since the circuit board 70 is mounted on a surface of the spool support portion 13 that faces the flange portion 12a of the spool 12, the coils 62 mounted around the periphery of the rotor 60 can be directly attached to the circuit board 70. Given this structure, a lead wire that connects the coils 62 and the circuit board 70 will be unnecessary, and unneeded insulation between the coils 62 and the circuit board 70 can be reduced. Moreover, since the coils 62 are mounted to the circuit board 70 attached to the spool shaft portion 13, the coils 62 can be mounted to the spool support portion 13 by only attaching the circuit board 70 to the spool support portion 13. Given this structure, the spool brake mechanism 25 can be easily assembled.

As shown in FIG. 8, the controller 55 is for example composed of a microcomputer 59 disposed on the circuit board 70 and provided with a CPU 55a, a RAM 55b, a ROM 55c, an I/O interface 55d. A control program is stored in the ROM 55c of the controller 55, as well as brake patterns that execute three brake processes (described below) in accordance with each of the eight levels of braking mode. In addition, preset values for tension and rotational speed during each braking mode are also stored in the ROM 55c. The external device connector 91, the rotational speed sensor 41, and a pattern identification sensor 45 are connected to the controller 55. The external device connector 91 can connect to the external device 100 and is for example a Universal Serial Bus socket. The rotational speed sensor 41 detects the rotational speed of the spool 12. The pattern identification sensor 45 detects the rotational position of the brake switch knob 43. In addition, the gates of each FET 63a of the switch element 63 are connected to the controller 55. The controller 55 controls the on/off state of the switch element 63 of the spool brake unit 40 at the cycle of, for example, $1/1000$ seconds in response to PWM (pulse width modulated) signals from each sensor 41 and 45 based on the control program (described below). More specifically, the controller 55 controls the on/off state of the switch element 63 with different duty ratios D depending on which of the eight levels of braking mode is selected. Electric power is supplied to the controller 55 from a condenser element 57. This electric power is also supplied to the rotational speed sensor 41 and the pattern identification sensor 45.

Referring now to FIGS. 5A, 5B, and 8, the pattern identification sensor 45 is provided in order to read out the three types of patterns 76a–76c of the identification pattern 76 formed on the back surface of the knob unit 73 of the brake switch knob 43. The pattern identification sensor 45 is composed of two electro-optical sensors 56a and 56b each having a light portion 56c and a receptor portion 56d. As shown in FIGS. 4 and 5B, the electro-optical sensors 56a and 56b are symmetrically disposed on the circuit board 70 such that they are aligned on the rear surface of the circuit board 70 that faces the wall surface 13a of the spool support portion 13. In other words, the receptor portions 56d of the electro-optical sensors 56a and 56b are aligned with each other, and the light portions 56c thereof are disposed on the outer sides of the aligned receptor portions 56d. Thus, the receptor portions 56d can be disposed separate from each other, and thus make it difficult for light from the opposite light portion 56c to be erroneously detected thereby. Viewing holes 13d and 13e are formed in the wall portion 13a of the spool support portion 13 such that they are vertically aligned, and allow the electro-optical sensors 56a and 56b to acquire the image of each pattern 76a–76c. Here, the eight levels of braking mode can be identified as will be described below by reading out the three types of patterns 76a–76c that are aligned in the rotational direction.

As shown in FIGS. 5A, 5B, and 7, when the indicator 73b is pointing the MIN position, the pattern identification sensor 45 will read out reflected light from two of the first patterns 76a. In this state, both electro-optical sensors 56a, 56b will both detect the largest amount of light. Then, if the indicator 73b is aligned with the next mark, the electro-optical sensor 56b on the left side of FIG. 5B will be positioned on the first pattern 76a and detect a strong amount of light, but the electro-optical sensor 56a on the right side will be positioned on the second pattern 76b and detect almost no light. The position of the brake switch knob 43 will be identified by combining these detected light amounts.

Referring now to FIGS. 5A, 5B, and 8, the condenser element 57 employs, for example, an electrolytic condenser, and is connected to a rectifier circuit 58. The rectifier circuit 58 is connected to the switch element 63, and converts alternating current from the spool brake unit 40 to direct current (the spool brake unit 40 has the rotor 60 and coils 62 and functions as an electric generator) and stabilizes the voltage to supply the electricity to the condenser element 57.

Note that the rectifier circuit 58 and the condenser element 57 are both provided on the circuit board 70. As shown in FIGS. 4, 5, and 5B both the circuit board 70 and the electrical components mounted on both sides thereof (such as the microcomputer 59) are covered with an insulating film 90 made from a synthetic resin insulating material that is colored so that light will only partially pass through the insulating film 90. The insulating film 90 is formed by a hot melt molding process in which a resin raw material is injected into a mold in which the circuit board 70 having electrical components such as the microcomputer 59 and electro-optical sensors 44, 56a, and 56b has been set. However, the insulating film 90 is not formed on the front and rear sides of regions 95 on which head portions 92a of the screws 92 are disposed, or on the light portions of the lights 44a, 56c and receptor portions of the receptors 44b and 56d of the electro-optical sensors 44, 55a, and 56b. In addition, the insulating film 90 is not formed on a region on which the external device connector 91 is mounted. This is because if the external device connector 91 were covered with the insulating film 90, it would ultimately be necessary to peel the insulating film 90 therefrom so that the input/output terminals 91b will be exposed to allow for a connection to the external device 100.

As shown in FIG. 5A, different thicknesses of the insulating film 90 are formed on four regions on the surface of the circuit board 70, the four regions including an inclined first region 97a on which the electro-optical sensors 44 are disposed, a second region 97b that has, for example, a thickness of 3.3 mm and on which the condenser element 57 and the rectifier circuit 58 are disposed, a third region 97c that has, for example, a thickness of 2.5 mm around the periphery of the coils, and a fourth region 97d that has a thickness of, for example, 1 mm.

In the first region 97a in which a light portion of the light 44a and a receptor portion of the receptor 44b of the electro-optical sensor 44 are disposed, as shown in FIG. 4, the insulating film 90 is formed such that it is inclined from the third region 97c toward the outer peripheral edge of the circuit board 70 so that the light 44a and the receptor 44b are bundled together.

As shown in FIG. 5B, on the rear surface of the circuit board 70, different thicknesses of the insulating film 90 are formed on three regions, the four regions including an inclined first region 98a that has, for example, thicknesses of 2.2 mm and 1.8 mm and on which the two electro-optical sensors 56a, 56b are disposed, a second region 98b that is divided into two portions and has, for example, a thickness of 2.8 mm, and on which the microcomputer 59 and the switch element 63 are disposed, and a third region 98c that has, for example, a thickness of 1 mm.

With the light portions of the lights 56c and the receptor portions of the receptors 56d of the electro-optical sensors 56a, 56b, the insulating film 90 is formed such that the thickness of the insulating film 90 in the first region 98a is different at the lights 56c and at the receptors 56d (the thickness around the lights 56c is preferably 2.2 mm and the thickness around the receptors 56d is, for example, preferably 1.8 mm). Further, the insulating film 90 is formed such that the first region 98a projects outward from the circuit board 70 more than the third region 98c so that the two sensors 56a and 56b are bundled together. Thus, by bundling the lights and receptors 44a, 56c, 44b, and 56d and the two optical sensors 56a and 56b together, the shape of mold 101 that forms the insulating film 90 to cover the electrical components such as the lights 44a and 56c, the receptors 44b and 56d, the microcomputer 59 and the switch element 63 can be simplified and molding costs can be reduced.

Furthermore, the insulating film 90 is formed on first regions 97a and 98a so that the insulating film 90 surrounds the peripheries of the lights 44a, 56c and the receptors 44b and 56d with tube shapes such that the tops of three lights 44a, 56c and the receptors 44b, 56d are open. A portion of the insulating film 90 that surrounds the light portions and receptor portions of the lights and receptors 44a, 56c, 44b, and 56d with tubular shapes function as a light shield with respect to the lights 44a, 56c and the receptors 44b, 56d.

A water-repelling layer is formed on the inner circumferential surface of the tubular portions of the insulating film 90 and on the lights and receptor portions by, for example, spraying a water repellent thereon. Thus, it will be difficult for moisture to remain because the light and receptor portions are surrounded with the tubular portions, even if moisture adheres to the inner peripheral surfaces of the tubular portions. Thus, contamination caused by the deposit of impurities contained in moisture can be controlled, and declines in the efficiency of the light portions and the receptor portions of the lights 44a, 56c and receptors 44b, 56d caused by this contamination can be controlled.

Note that the reason why the insulating film 90 is not formed on the regions 95 on which the head portions 92a of the screws 92 are to be disposed is because if the insulating film 90 is formed on the regions 95 on which the head portions 92a of the screws 92 are to be disposed, the insulating film 90 will delaminate due to contact between the heat portions 92a and the insulating film 90 when the screws 92 are screwed into the circuit board 70. Further, this delamination may occur over the entire circuit board 70. However, if the regions 95 on which the head portions 92a of the screws 92 are disposed are not covered with the insulating film 90, the head portions 92a will not come into contact with the insulating film 90 when the screws 92 are screwed into the circuit board 70. Given this structure, the insulating film 90 will not delaminate, and it will be difficult for insulation failure to occur due to delamination. In addition, if the insulating film 90 covers light portions of the lights 44a and 56c and receptor portions of the receptors 44b and 56d of the electro-optical sensors 44, 55a, and 56b, the amount of light that is emitted from the lights 44a and 56c, the amount of light reflected from the read-out pattern and the identification pattern, and the amount of light received by the receptors 44b and 56d will be reduced. Thus, the light may not be correctly detected by the receptors 44b and 56d, even if these components are covered with a transparent insulating film.

However, in the present embodiment, a reduction in the light that is emitted from the lights 44a and 56c and is reflected by the patterns can be prevented because the lights 44a, 56c and the receptors 44b, 56d are not covered by the insulating film 90. Given this structure, it will be difficult for operational errors in the electro-optical sensors 44, 56a, and 56b to occur due to a reduction in the amount of light received by the receptors 44b and 56d or the wrong light being received by the receptors 44b and 56d. In addition, the peripheries of the light portions and receptor portions are shielded. Thus, it will be difficult for light to be emitted on or from the peripheries of the light portions and receptor portions because a synthetic resin is used for the insulating film 90, thus making it difficult for colored light to pass through, and because the insulating film 90 is formed so that the insulating film 90 surrounds the peripheries of the lights 44a and 56c and the receptors 44b and 56d of the electro-optical sensors 44, 56a, and 56b with the tube shapes such that the tops of the lights 44a, 56c and the receptors 44b, 56d are open. Thus, even if the lights 44a and 56c and the receptors 44b and 56d are disposed close to each other, it will be difficult for light to be received directly from the lights 44a and 56c by the receptors 44b and 56d. Thus, operational errors can be prevented.

Insulating Film 90 Formation Process

The process of forming the insulating film 90 so that it covers the circuit board 70 will now be described.

If the insulating film 90 is formed by a hot melt molding method, the circuit board 70 on which electrical components have been set will be mounted inside a mold. Then, a hot melt processing device is used to inject a hot melt sealant into the mold at a low temperature and low pressure. When cooled in the interior of the mold, the insulating film 90 will be formed on the surface of the circuit board 70.

By covering each unit on the circuit board 70 in this manner with an insulating film 90 made of an insulating material, liquids can be prevented from entering the electrical components such as the microcomputer 59. Moreover, in this embodiment, it will be unnecessary to replace the electric power source because the electrical power that is generated will be stored in the condenser element 57 and this electrical power will be used to operate the controller 55 and the like. Given this arrangement, the sealing of the insulating film 90 can be made permanent, and trouble caused by insulation failure can be further reduced.

Operation and Function of the Reel During Fishing

Referring now to FIGS. 2, 4, and 8, when fishing is performed with this reel, it is preferable that casting is performed first so that electrical power is stored in the condenser element 57. In other words, electric power is generated with the coils 62 during casting and stored in the condenser element 57. This way, the circuit is capable of being operated by the electrical power stored in the condenser element 57.

When casting at a fishing spot, the clutch lever 17 is pressed down to place the clutch mechanism 21 in the clutch off position. In this clutch off state, the spool 12 can rotate freely, and the fishing line will unwind from the spool 12 at full speed when casting due to the weight of the tackle. When the spool 12 rotates due to casting, the magnets 61 rotate around the inner peripheral sides of the coils 62, and if the switch element 63 is activated, an electric current will flow through the coils 62 and the spool 12 will be braked. During casting, the rotational speed of the spool 12 will gradually become faster, and will be gradually reduced once a peak is exceeded.

Here, even though the magnets 61 are disposed near the bearing 26b, it is difficult for the bearing 26b to become magnetized, and the ability of the spool 12 to rotate freely will improve because the magnetic washer member 66 is disposed between the magnets 61 and the bearing 26b. Further, in this arrangement there is a gap of 2.5 mm or greater between the magnets 61 and the bearing 26b, thus improving performance even more. In addition, it would be difficult for cogging to occur, and the ability of the spool 12 to rotate freely would improve because the coils 62 are coreless coils.

When the tackle lands in the water, the clutch mechanism 21 is placed in the clutch-on state by rotating the handle 2 in the line winding direction and by a clutch return mechanism (not shown in the figures), and the reel unit 1 is palmed to await a bite from a fish.

Control Operation of the Controller 55

Figure 9:
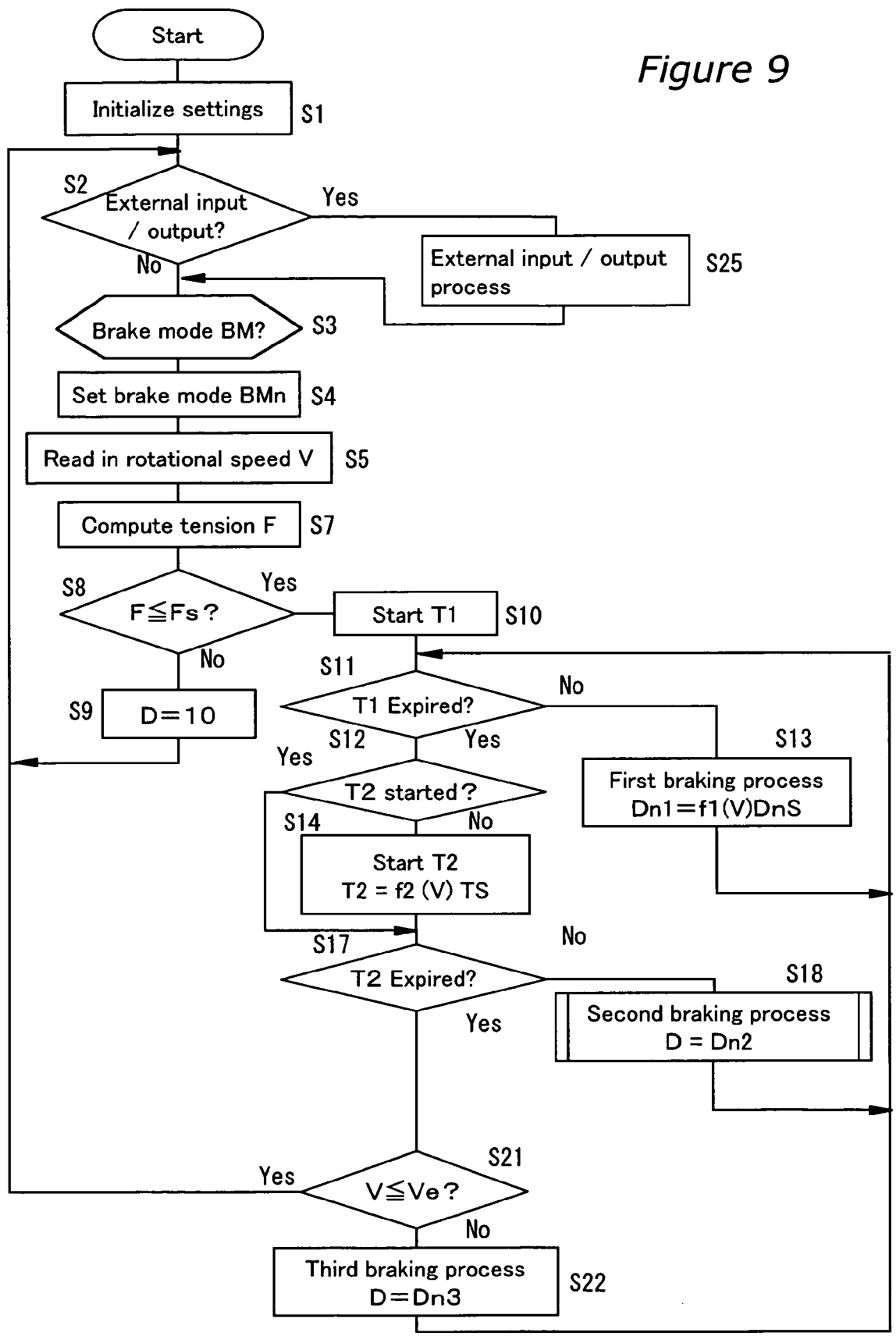
FIG. 9 is a view of a flowchart illustrating primary control processes of a controller of the spool brake mechanism in accordance with the first embodiment of the present invention.

Next, the brake control operation performed by the controller 55 according to the control program during casting will be described with reference to the control flowcharts of FIGS. 9 and 10 and the graphs in FIGS. 11 and 12.

Initialization occurs at Step S1 when the spool 12 rotates due to casting, electric power is stored in the condenser element 57, and an electric power supply flows into the controller 55. Here, various flags and variables are reset. In Step S2, it is determined whether or not input to or output from the external device 100 has been required. This is performed, for example, by determining whether or not the connector of the external unit 100 is connected to the external device connector 91. If it is determined that the external device 100 is connected, then the process moves from Step S2 to Step S25 and an external input/output process is performed. Here, the microcomputer 59 operates by instructions from the external device 100, and processes such as modifying the control program stored in the ROM 55c, outputting stored values to the external device 100, and modifying the stored settings for the brake force are performed. Here, the external device 100 can be accessed because the external device connector 91 is provided.

In Step S3, it is determined whether or not any braking mode BMn has been selected by the brake switch knob 43 (n is an integer between 1 and 8). At Step S4, the braking mode that was selected is set as braking mode BMn. When this occurs, a duty ratio D that corresponds to the braking mode BMn will be read out from the ROM 55c inside the controller 55. At Step S5, a rotational speed V of the spool 12 at the time the casting begins is detected by pulses from the rotational speed sensor 41. At Step S7, tension F applied to the fishing line that is released from the spool 12 is computed.

Here, the tension F can be determined from the rate of change of the rotational speed of the spool 12 ($\Delta\omega/\Delta t$) and the moment of inertia J of the spool 12. When the rotational speed of the spool 12 changes at a certain point, the charge in the rotational speed of the spool 12 is due to rotational drive force (torque) generated by the tension from the fishing line. If we assume that the rate of change of the rotational speed at this time is ($\Delta\omega/\Delta t$), then the drive torque T can be expressed as equation (1) below.

$$T = J \times (\Delta\omega/\Delta t) \qquad (1)$$

If the drive torque T is determined from equation (1), the tension from the radius of the point of application of the fishing line (normally 15 to 20 mm) can be determined. The present inventors discovered that if a large braking force is applied when this tension is at or below a predetermined value, the attitude of the tackle (lure) will reverse and stabilize just before the peak rotational speed of the spool 12 is reached, and the tackle will fly more effectively. The following control is conducted in order to brake the spool 12 just before its peak rotational speed and make the tackle fly with a stable attitude. In other words, a strong braking force should be applied to the spool 12 for a short period of time at the beginning of casting to make the tackle reverse (first braking process), and after this the spool 12 will be braked with a braking force that gradually weakens to a constant amount during casting (second braking process). Finally, the spool 12 will be braked with a braking force that gradually weakens until the number of rotations of the spool 12 falls below a predetermined value (third braking process). The controller 55 will perform these three braking processes.

In Step S8, it is determined whether or not the tension F computed by the rate of change of the rotational speed ($\Delta\omega/\Delta t$) and the moment of inertia J is at or below a predetermined value Fs (for example, a value in a range between 0.5N and 1.5N). If the tension F exceeds the predetermined value Fs, then the process moves to Step S9, where the duty ratio D is set to 10 (i.e., the switch element 63 is turned on for only 10% of a cycle), and the process returns to Step S2. When this occurs, the spool brake unit 40 slightly brakes the spool 12, but the spool control unit 42 will stably operate because the spool brake unit 40 generates electricity.

If the tension F is at or below the predetermined value Fs, then the process moves to Step S10. In Step S10, a timer T1 is started. This timer T1 determines the length of time during which a first braking process will be applied that brakes the spool 12 with a strong braking force. At Step S11, it will be determined whether or not the timer T1 has timed out. If the timer T1 has not timed out, then the process moves to Step S13 and the first braking process is conducted during casting until the timer T1 times out. As shown by the hatching in the lower left portion of FIG. 11, this first braking process brakes the spool 12 for only a time T1 with a fixed first duty ratio Dn1. This first duty ratio Dn11 is for example 50–100% duty (on 50%14 100% of the time during the entire cycle), and preferably in a range between 70–90% duty, and changes depending upon the rotational speed V detected at Step S5. In other words, the first duty ratio Dn1 is a value that is computed by multiplying a function f1 (V) of the spool rotational speed V at the beginning of casting by a duty ratio DnS that is predetermined in accordance with the braking mode. In addition, the time T1 is preferably in a range between 0.1 to 0.3 seconds. When braking occurs within this time range, it will be easier to brake the spool 12 before it reaches its peak rotational speed.

The first duty ratio Dn1 is shifted up or down depending upon the braking mode BMn. In this embodiment, when the braking mode is at the highest value (n=1), a duty ratio D11 will be the maximum and will gradually decrease from this point. When a strong braking force is applied for a short period of time as described above, the attitude of the tackle will reverse from its fishing line engagement portion, the fishing line engagement portion will come to the front, and the tackle will fly effectively. When this occurs, the attitude of the tackle will be stable, and thus the tackle will fly further.

On the other hand, when the timer T1 times out, the process moves from Step S11 to Step S12. At Step S12, it will be determined whether or not a timer T2 has already started. If the timer T2 has started, then the process moves to Step S17. If the timer T2 has not started, then the process moves to Step S14 and the timer T2 is started. The timer T2 determines the length of time during which a second braking process will be performed.

At Step S17, it will be determined whether or not the timer T2 has timed out. If the timer T2 has not timed out, then the process moves to Step S18 and the second braking process is conducted until the timer T2 times out. As shown by the hatching in the lower right portion of FIG. 11, the second braking process brakes the spool 12 during a second predetermined time period T2 at a duty ratio Dn2, which decreases rapidly at first, then decreases gradually, and finally remains at a constant value. The minimum value of the duty ratio Dn2 is preferably in a range between, for example, 30 and 70%. In addition, the second predetermined time T2 is preferably between 0.3 to 2 seconds. Like the first duty ratio Dn1, the second predetermined time T2 also changes according to the spool rotational speed V at the beginning of casting. For example, the second predetermined time T2 is calculated by multiplying a function f2(V) of the spool rotational speed V at the beginning of casting with a predetermined time period TS.

Figure 10:
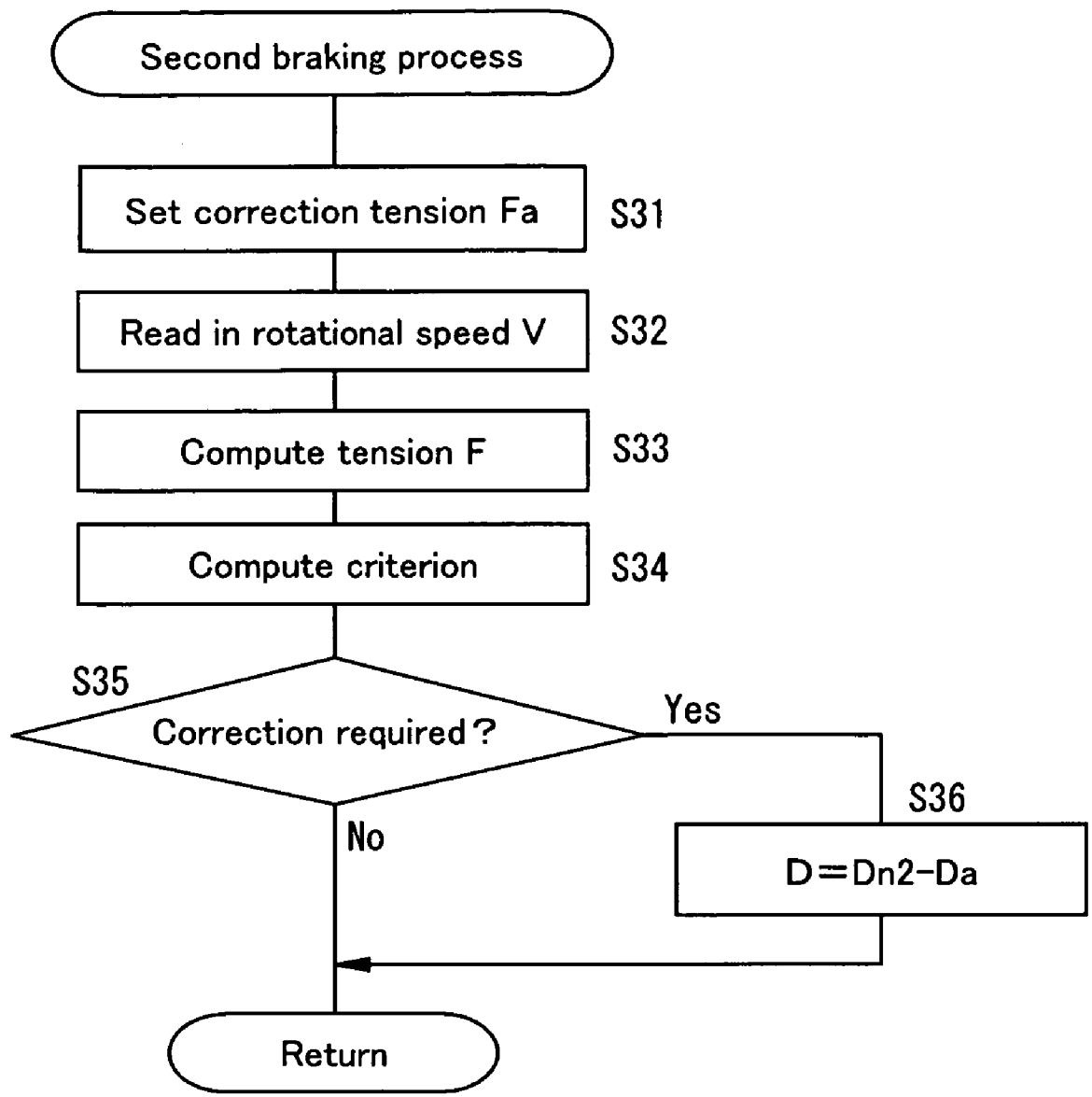
FIG. 10 is a flowchart showing a second control process of the controller in accordance with the first embodiment of the present invention.
Figure 11:
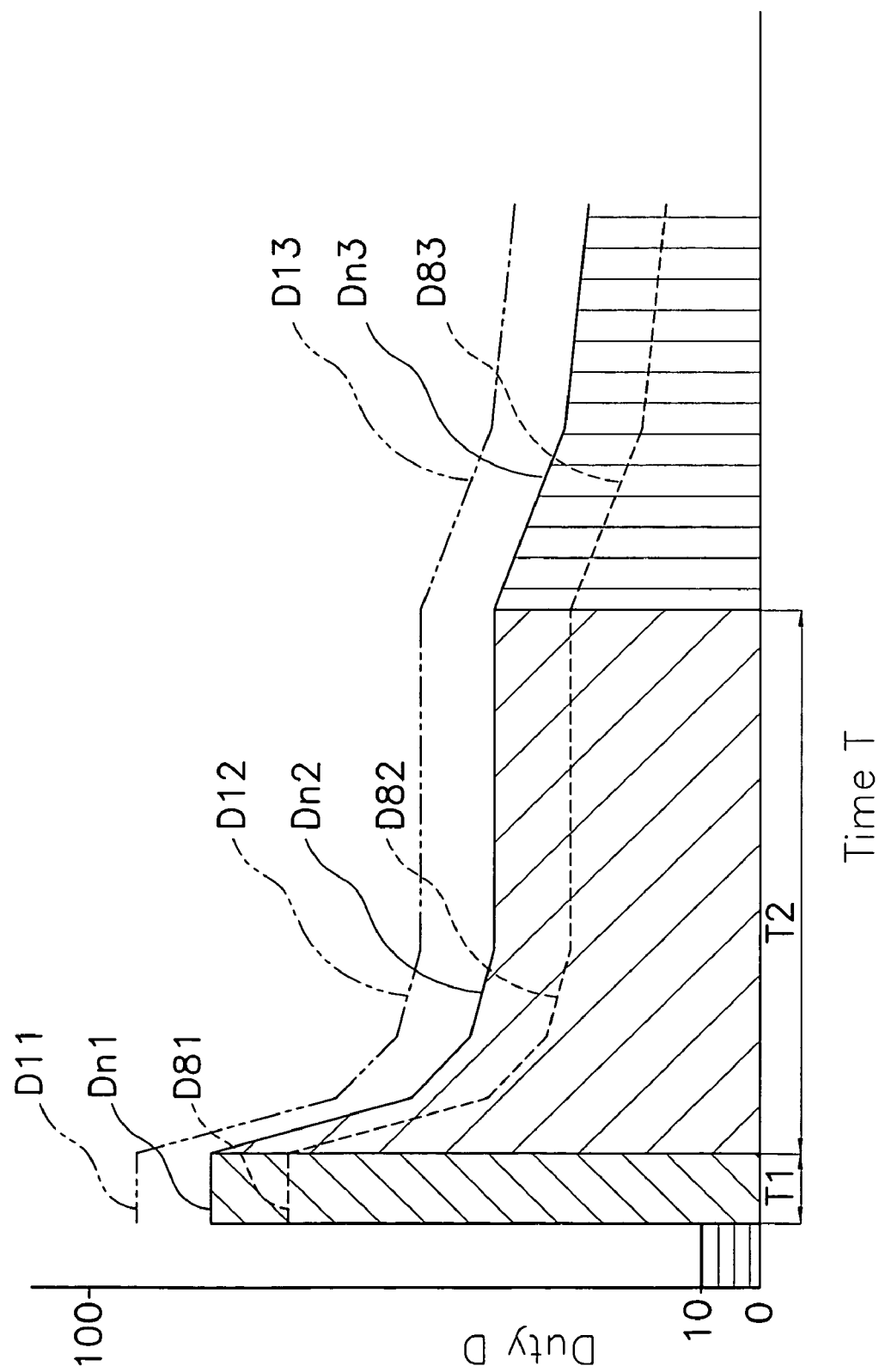
FIG. 11 is a graph that schematically illustrates the change in the duty ratios of each control process of the controller in accordance with the first embodiment of the present invention.

In addition, a brake correction process like that shown in FIG. 10 is carried out in the second braking process and a third braking process for the purpose of cutting extraneous braking force. In Step S31 of FIG. 10, a correction tension Fa is set. The correction tension Fa is a function of time like those shown by the dotted and dashed lines in FIG. 12, and is set such that it gradually declines over time. Note that in FIG. 12, a graph of the correction process in the third braking process is illustrated.

The spool rotational speed V is read in at Step S32. At Step S33, the tension F is computed in the same sequence as in Step S7. At Step S34, a criterion expressed by the following equation (2) is computed from the tension obtained in Step S33. At Step S35, it is determined whether or not brake correction is needed based on the criterion.

$$C = SSa \times (F - SSd \times \text{rotational speed}) - (\Delta F / \Delta t) \quad (2)$$

Here, SSa, SSd are coefficients with respect to the rotational speed (rpm). SSa is for example 50. In addition, SSd is 0.000005.

When the results of equation (2) are normal, in other words when it is determined that the computed value of the tension F exceeds the set tension Fa by a large amount, then it is determined in Step S35 that the correction required and the process moves to Step S36. At Step S36, the second duty ratio Dn2 that was previously set will be corrected by subtracting a fixed amount Da therefrom by the next sampling cycle (normally each rotation).

At Step S21, it is determined whether or not the speed V is at or below a brake completion speed Ve. If the speed V exceeds the brake completion speed Ve, then the process moves to Step S22. The third braking process is carried out at Step S22.

Figure 12:
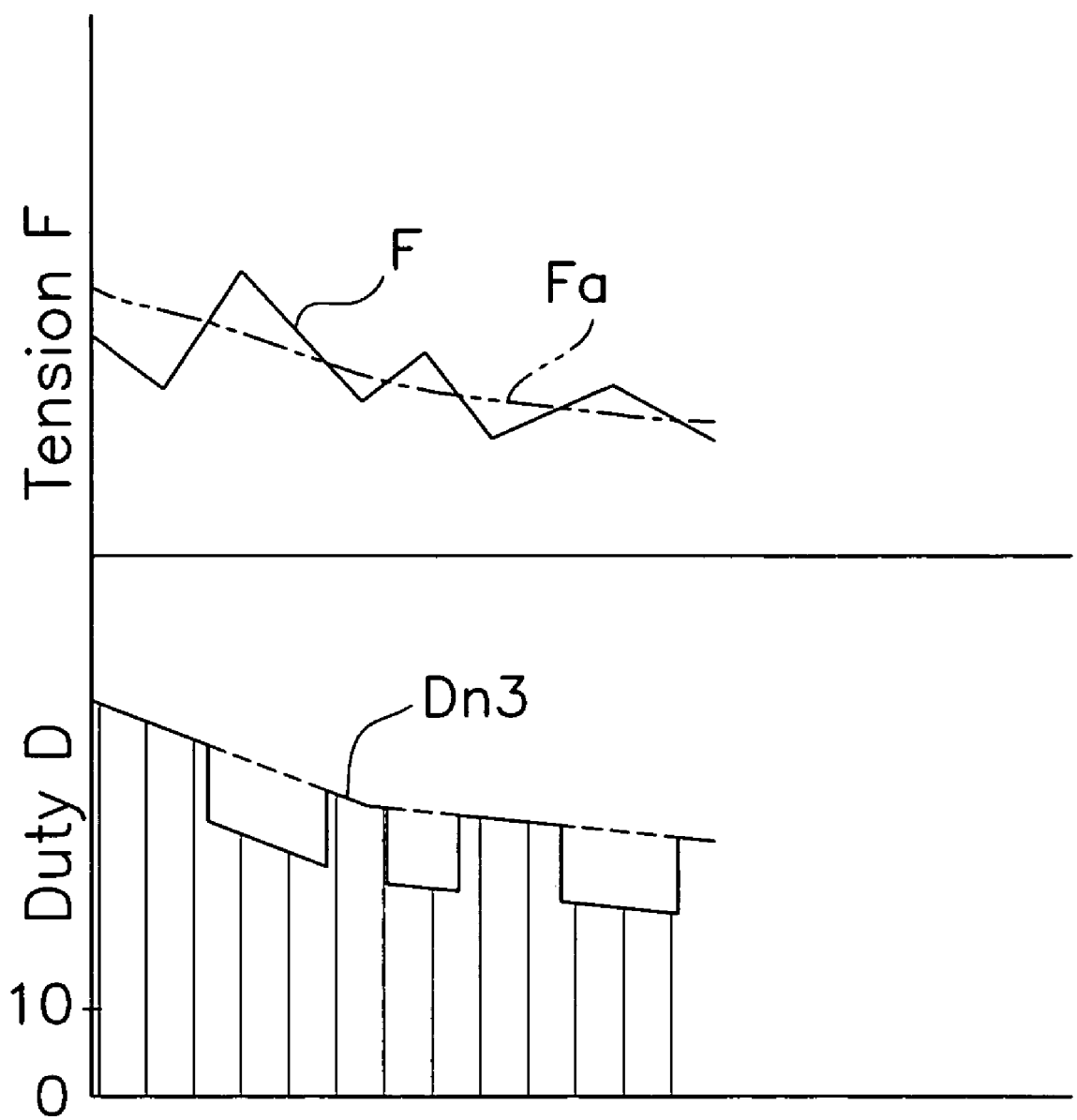
FIG. 12 is a view of graphs that schematically illustrate an auxiliary process of a third control process of the controller in accordance with the first embodiment of the present invention.

As shown by the vertical hatching in FIG. 12, the third braking process brakes the spool 12 with a duty ratio Dn3 that changes over time like the second braking process and in which the rate of decline gradually becomes smaller. Then, the process returns to Step S11, and the brake correction process is executed in the third braking process until the speed V is determined to be equal to or lower than the brake completion speed Ve in Step S21.

If the speed V is at or below the brake completion speed Ve, then the process returns to Step S2.

Here, if the spool 12 is braked with a strong braking force before the rotational speed of the spool 12 peaks, tension that was at or below the first predetermined value Fs will be rapidly increased, backlash will be prevented, and the tackle will fly in a stable manner. Due to this arrangement, backlash can be prevented, the attitude of the tackle can be stabilized, and the tackle can be cast out farther.

In addition, since the spool is controlled in three braking processes with different duty ratios and braking times in accordance with the rotational speed of the spool at the beginning of casting, the spool will be braked with duty ratios and braking times that differ depending upon the rotational speed of the spool, even when the settings are the same. Thus, it is unnecessary to adjust manually the braking force even when casting is performed with different spool rotational speeds, and thus the burden on the fisherman can be reduced.

ALTERNATE EMBODIMENTS

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Figure 13:
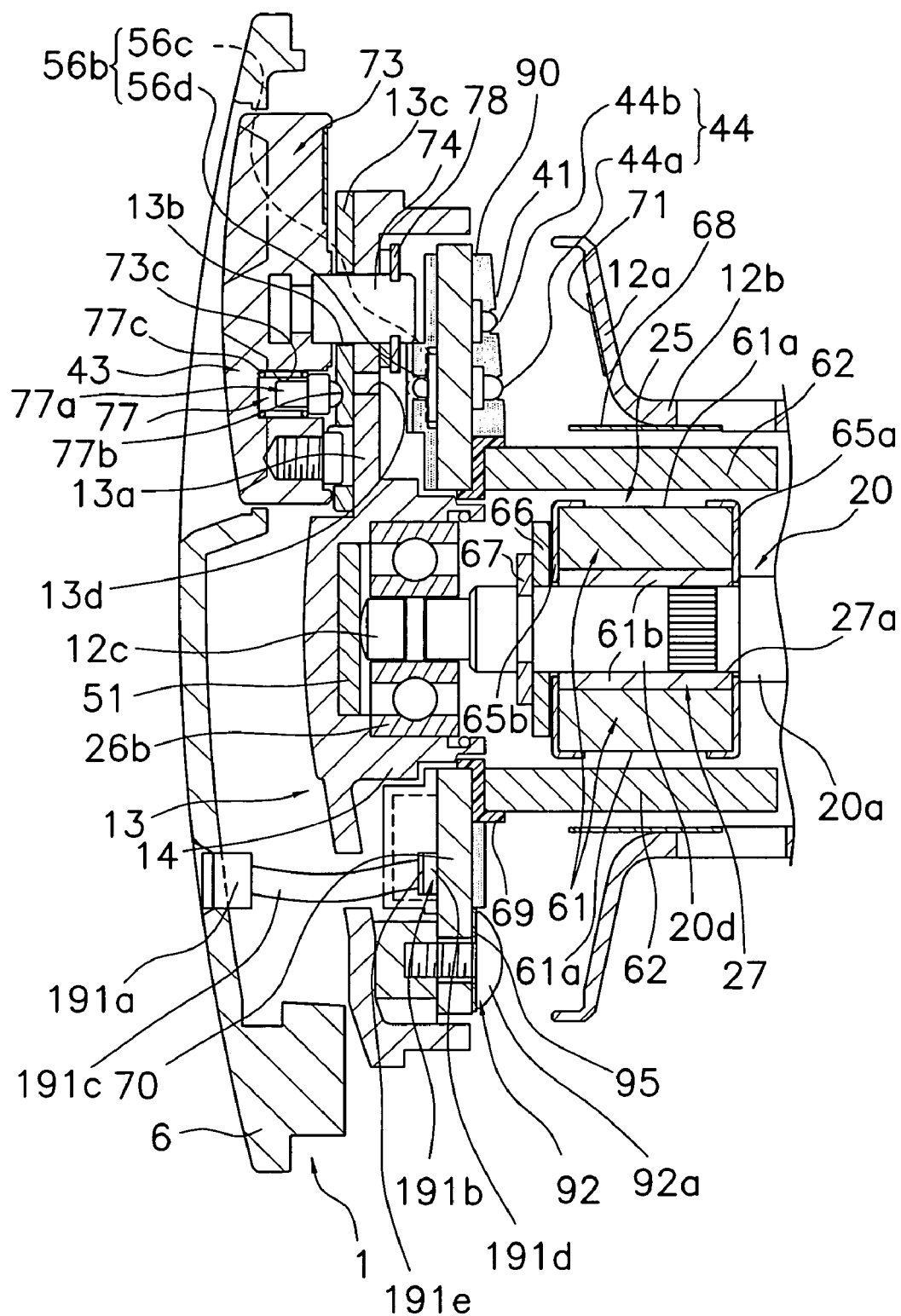
FIG. 13 is a view of a spool brake mechanism corresponding to FIG. 4 in accordance with a first alternate embodiment of the present invention.

(a) In the aforementioned embodiment, the external device connector 91 is directly mounted to the circuit board 70. However, as shown in FIG. 13, an external device connector 191 may be formed from a socket 191a that is mounted on the first side cover 6 and exposed to the exterior of the fishing reel, a connector 191b that is mounted on the circuit board 70, and a cable 191c that connects the socket 191a with the connector 191b. With this configuration, the insulating film 90 will not be formed on the region where the connector 191b is disposed. In addition, if the connector 191b is formed from a first connector 191d that is mounted on the circuit board 70 and a second connector 191e that is detachably connected to the first connector 191d, it will be easy to connect the external device connector 191 to the circuit board 70 because the connection will be completed by only mounting the first connector 191d to the circuit board 70.

Figure 20:
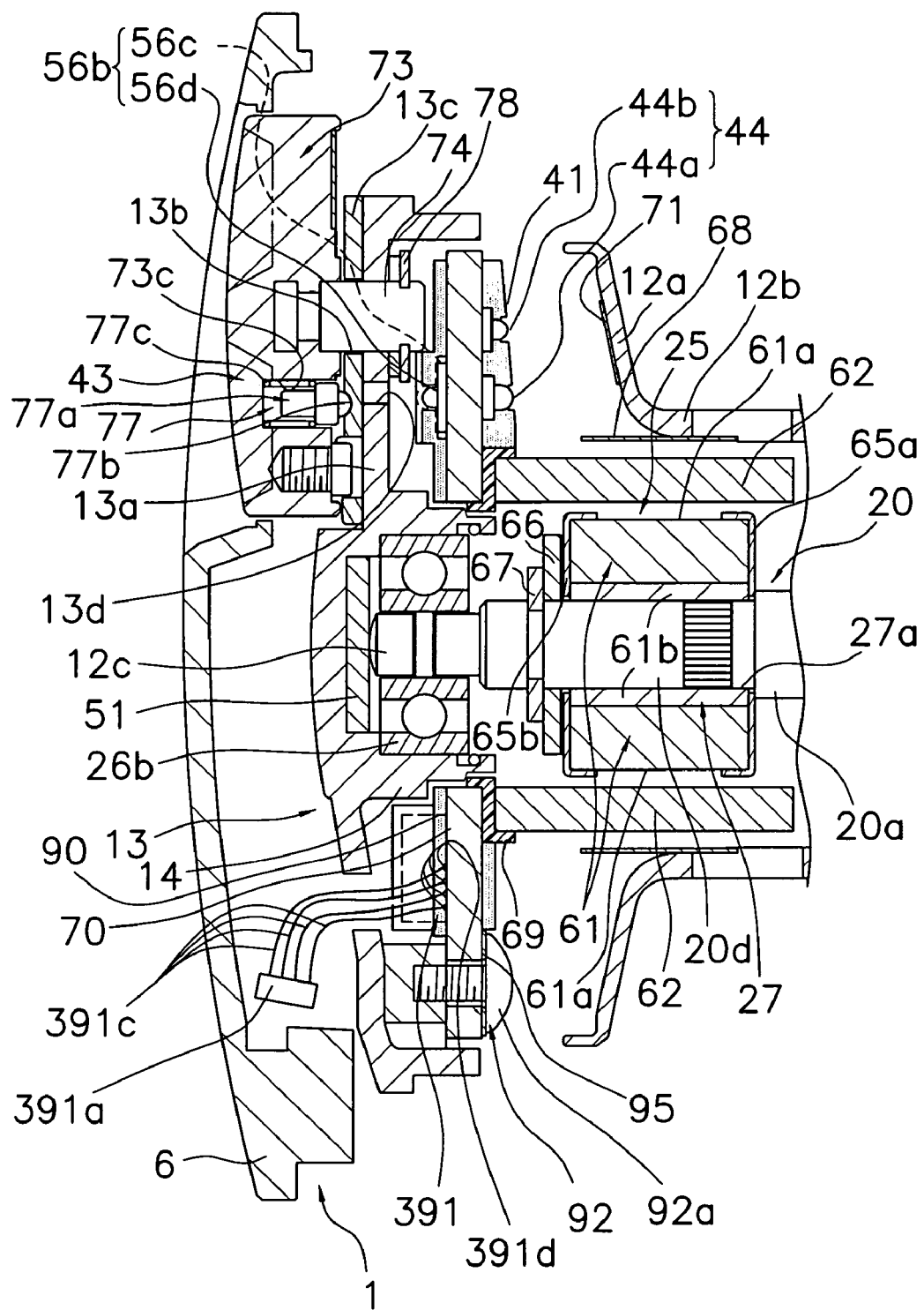
FIG. 20 is a magnified partial cross-sectional view of the spool brake mechanism in accordance with a fourth alternate embodiment of the present invention.

As shown in FIG. 20, it is also possible to structure an external device connector 391 without a connector potion, but with a socket 391a, cables 391c that are connected to the socket 391a, a plurality of (four in this embodiment) connecting points 391d that are mounted on the circuit board 70 and are for connecting with the cables 391c. In this case, the cables 391c are attached to the connecting points 391d directly through a conventional attaching method such as soldering. Also in this embodiment, after the cables 391c are connected to the connecting points 391d, the connecting points 391d as well as the cables 391c are covered with the insulating film 90.

Figure 14A:
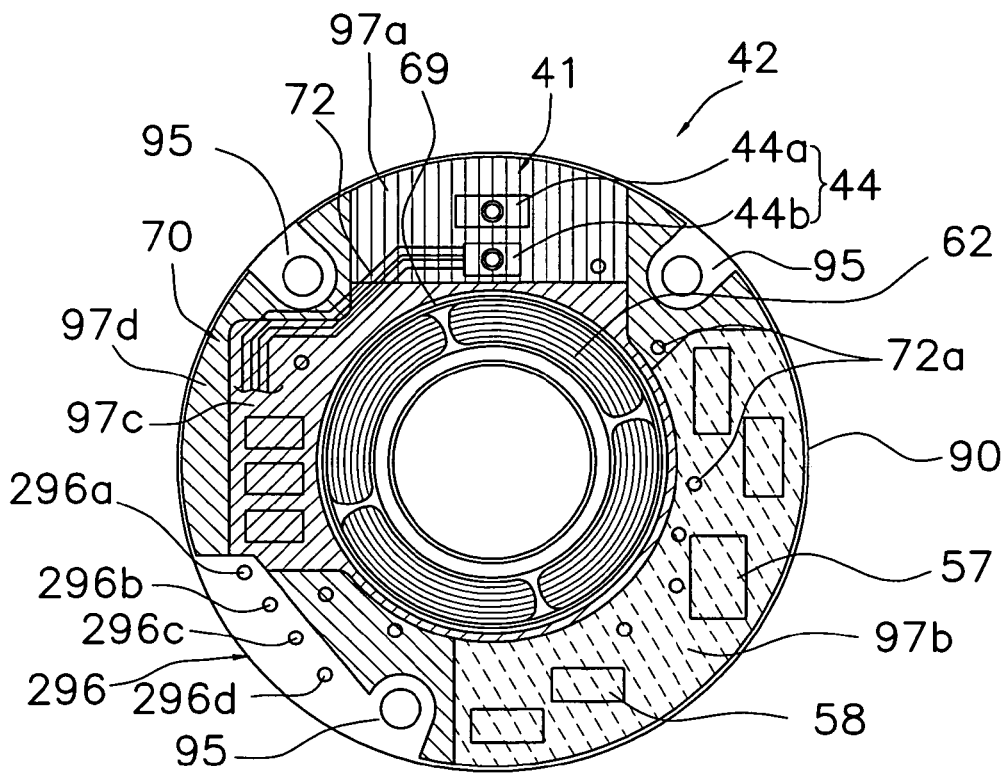
FIG. 14A is a magnified partial cross-sectional view of the disposition of components on a circuit board of the spool brake mechanism in accordance with a second alternate embodiment of the present invention.
Figure 14B:
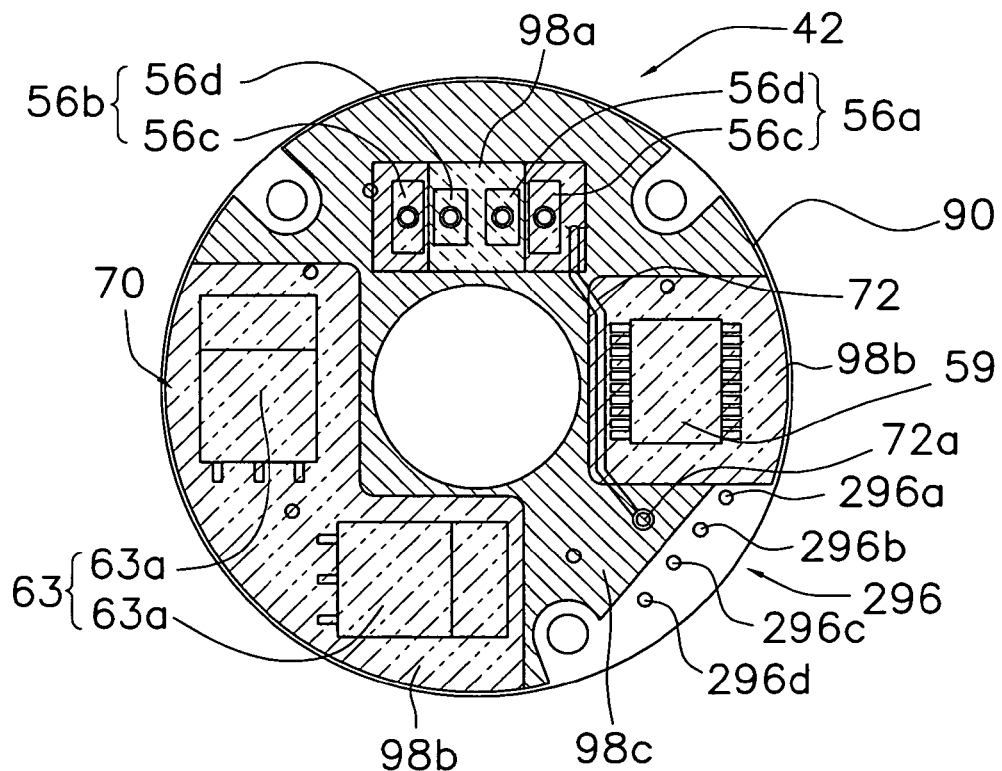
FIG. 14B is a rear elevational view of the disposition of components on the circuit board of the spool brake mechanism in accordance with the second alternate embodiment.

(b) In the aforementioned embodiments, the external device connectors 91 and 191 are mounted to the circuit board 70, however as shown in FIGS. 14A and 14B, an external device connector 296 may be formed on the circuit board 70. The external device connector 296 is, for example, formed on the circuit board 70 and connects an inspection device (an example of the external device 100) that inspects whether or not the electronic circuit is operating normally. Four contact points 296a–296d, for example, that are capable of being electrically connected to an inspection device are formed on the external device connection 296, and when the inspection of the circuit is completed, an insulating film 90 is formed by, for example, the hot melt spray method, on the region on which the external device connector 296 is formed. The external device connector 296 having this type of configuration is also included in the present invention.

Figure 15:
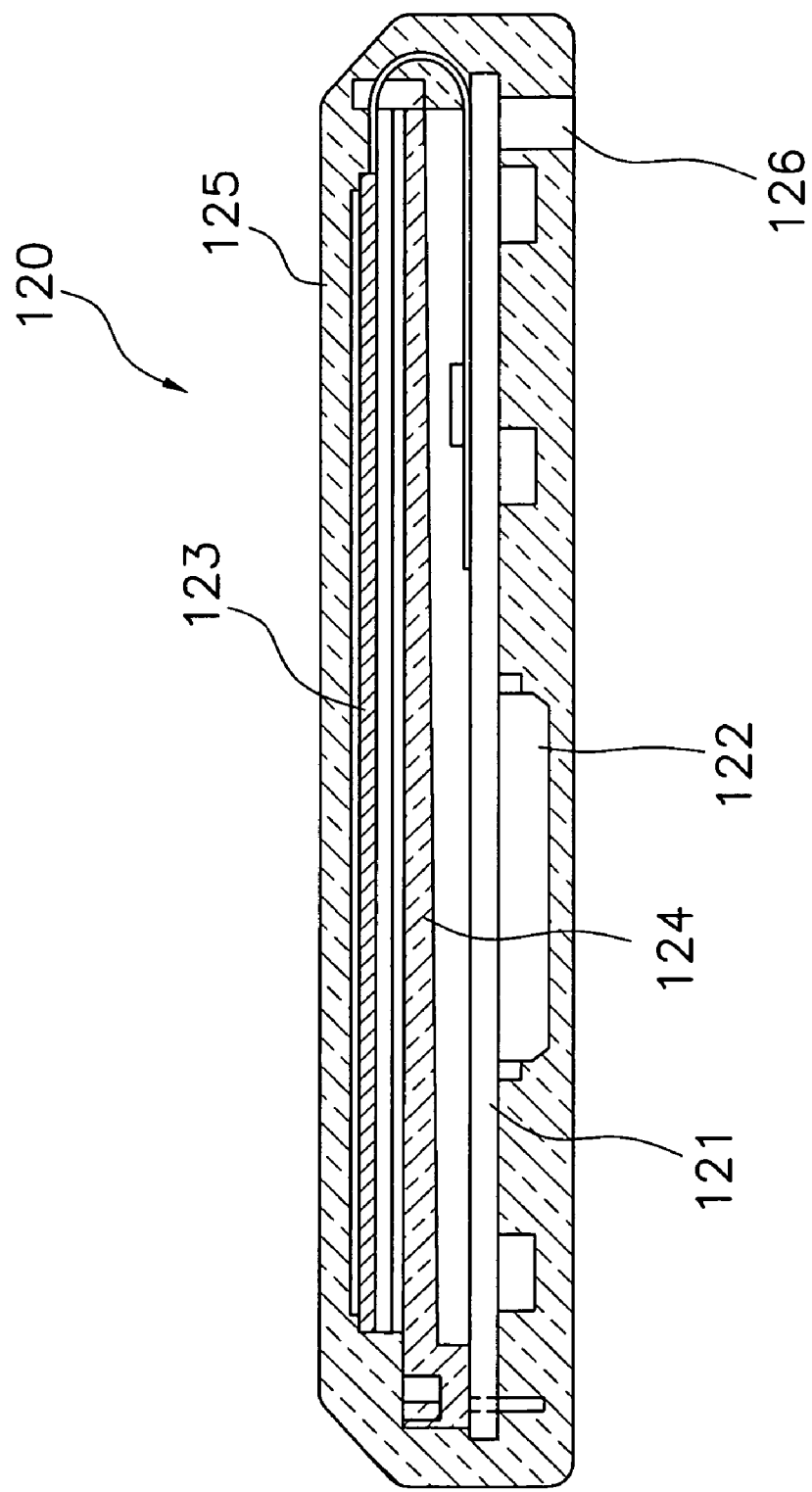
FIG. 15 is a cross-sectional view illustrating a circuit board device in accordance with a third alternate embodiment of the present invention.

(c) In the aforementioned embodiment, a dual bearing reel was cited as an example of fishing equipment, and the present invention was applied to an electronic circuit device of a spool control unit that controls a spool braking mechanism of the dual bearing reel. However, the fishing equipment of the present invention is not limited to a fishing reel. For example, as shown in FIG. 15, the present invention can be applied to a water depth display device provided on a fishing reel, or to a fishing data display device provided separately from a reel.

A display device (an example of fishing data display) 120 displays the depth at which tackle mounted on the end of a fishing line that is wound around the spool is located in the water, or displays fishing data such as data for a fish finder (example of fishing data), and is provided either separately from the reel or on the reel. The display device 120 includes a circuit board 121, a controller (an example of electric component) 122 that is mounted on the circuit board 121 as an electric component, a liquid crystal display 123, a backlight 124, and an external device connector 126. The liquid crystal display device 123 is arranged spaced apart from the circuit board 121, and the backlight 124 is arranged between the liquid crystal display 123 and the circuit board 121. The periphery between the liquid crystal display 123 and the circuit board 121 is covered with an insulating film 125. The external device connector 126 is disposed on the rear surface of the circuit board 121 (the surface on the opposite side of the liquid crystal display 123), and can connect to, for example, an external device such as a fishing reel or a computer. The insulating film 125 is made from a translucent synthetic resin, and is formed on all regions except the external device connector 126 by the hot melt molding method. The surface of the insulating film 125 is covered with a color pattern, except for the surface of the insulating film 125 that faces the liquid crystal display 123.

In addition, a condenser element (not shown in the figures) is mounted on the circuit board 121. When the display device is provided on the reel, the condenser element is configured so that electric power is supplied from an electricity generating mechanism that generates electricity by the rotation of the spool. Note that when the display device is provided separately from the reel, the electric power may be supplied to the condenser element from an external battery via the external device connector 126. In addition, the electric power and the fishing data may be obtained wirelessly.

According to the present invention, insulation performance can be maintained at a high level because the circuit board and the electric components disposed thereon are covered with an insulating film, except for the external device connector that cannot be insulated because of the connection with the external device. In addition, enlargement of fishing equipment can be prevented because the circuit board can be mounted on the exterior of the case rather than being accommodated inside the case in order to be shielded from water. Furthermore, the external device connector can be connected with an external device and can be accessed from the exterior because the external device connector is not covered with the insulating film.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-160589 and 2003-134900. The entire disclosures of Japanese Patent Application Nos. 2003-160589 and 2003-134900 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An electronic circuit device for use in a fishing equipment and adapted to be connected to an external device, the electronic circuit device comprising:

a circuit board that includes an electronic circuit formed on at least one of front and rear surfaces thereof;

a plurality of electric components including a microcomputer that controls the fishing equipment through a control program, the plurality of electric components being mounted on the circuit board such that they are electrically connected to the electronic circuit;

an external device connector configured to connect the external device to the electronic circuit to transfer signals to/from the external device; and an insulating film directly attached to the circuit board and covering the circuit board at least partially so as to cover the electric components.

2. The electronic circuit device for fishing equipment as set forth in claim 1, wherein the external device connector is at least partially mounted on the circuit board such that the external device connector is electrically connected to the electronic circuit, and the insulating film covers the circuit board at least partially but not where the external device connector is mounted.

3. The electronic circuit device for fishing equipment as set forth in claim 1, wherein the fishing equipment is a fishing reel that includes a reel unit and a spool that is rotatively mounted to the reel unit; and the circuit board is configured to be mounted on a wall surface of the reel unit.

4. The electronic circuit device for fishing equipment as set forth in claim 3, wherein the fishing reel is a dual bearing reel that further includes magnets that are non-rotatably mounted to a rotation shaft of the spool to rotate together with the spool, magnetic poles of the magnets differing in a rotational direction; and the electronic circuit device further includes a plurality of coils that are mounted to the circuit board and adapted to be disposed around the magnets;

the microcomputer being configured to brake the spool by controllably switching generation of electric power, the electric power being generated by rotation of the coils relative to the magnets.

5. The electronic circuit device for fishing equipment as set forth in claim 4, wherein the spool includes a tubular bobbin portion around which fishing line is to be wound, and a pair of flange portions formed on both ends of the bobbin portion, the flange portions having diameters that are larger than a diameter of the bobbin portion; and the circuit board is a washer shaped member that is configured to be arranged so as to be concentric with the rotation shaft of the spool and face one of the flange portions.

6. The electronic circuit device for fishing equipment as set forth in claim 4, wherein the external device connector is configured to receive from the external device brake force setting data that sets a brake force to be applied to the spool.

7. The electronic circuit device for fishing equipment as set forth in claim 1, wherein the circuit board includes electronic circuits on both of its front and rear surfaces.

8. The electronic circuit device for fishing equipment as set forth in claim 1, wherein the external device connector is configured to allow input and/or output of data between the microcomputer and the external device.

9. The electronic circuit device for fishing equipment set forth in claim 1, wherein the external device connector is configured to receive from the external device data relating to the control program.

10. The electronic circuit device for fishing equipment as set forth in claim 1, wherein the external device connector is configured to be connected to the external device that inspects the electronic circuit formed on the circuit board.

11. The electronic circuit device for fishing equipment as set forth in claim 1, wherein the insulating film is formed by a hot melt molding method, in which a resin material is injected into a mold into which the circuit board with the electric components mounted thereon is set.

12. The electronic circuit device for fishing equipment as set forth in claim 1, wherein the external device connector includes a socket that is mounted on the circuit board, the socket including an input/output terminal electrically connected to the electronic circuit.

13. The electronic circuit device for fishing equipment as set forth in claim 1, further comprising a detachable cap member coupled to the external device connector.

14. The electronic circuit device for fishing equipment as set forth in claim 1, wherein the fishing equipment is a fishing data display.

15. The electronic circuit device for use in a fishing equipment and adapted to be connected to an external device, the electronic circuit device comprising:

a circuit board that includes an electronic circuit formed on at least one of front and rear surfaces thereof;

a plurality of electric components including a microcomputer that controls the fishing equipment through a control program, the plurality of electric components being mounted on the circuit board such that they are electrically connected to the electronic circuit;

an external device connector adapted to connect the external device to the electronic circuit; and an insulating film that covers the circuit board at least partially so as to cover the electric components, the external device connector including a socket that is exposed to an exterior of the fishing equipment.

16. The electronic circuit device for fishing equipment as set forth in claim 15, wherein the external device connector further includes a connector adapted to be connected to the external device and a cable that connects the socket with the connector.

17. A fishing reel adapted to be attached to a fishing rod and connected to an external device, comprising:

a reel unit;

a handle rotatably supported by the reel unit;

a spool rotatably mounted on a spool shaft and supported by the reel unit; and an electronic circuit device mounted on the reel unit and including a circuit board that includes an electronic circuit formed on at least one of front and rear surfaces thereof, a plurality of electric components including a microcomputer that controls the fishing equipment through a control program, the plurality of electric components being mounted on the circuit board such that they are electrically connected to the electronic circuit, an external device connector configured to connect the external device to the electric circuit to transfer signals to/from the external device, and an insulating film directly attached to the circuit board and covering the circuit board at least partially so as to cover the electric components.

18. The fishing reel as set forth in claim 17, wherein the external device connector is at least partially mounted on the circuit board such that the external device connector is electrically connected to the electronic circuit, and the insulating film covers the circuit board at least partially but not where the external device connector is mounted.

19. The fishing reel as set forth in claim 17, wherein the circuit board is mounted on a wall surface of the reel unit.

20. The fishing reel as set forth in claim 17, further comprising magnets that are non-rotatably mounted to the rotation shaft of the spool to rotate together with the spool, magnetic poles of the magnets differing in a rotational direction; and the electronic circuit device further including a plurality of coils that are mounted to the circuit board and disposed around the magnets;

the microcomputer braking the spool by controllably switching generation of electric power, the electric power being generated by rotation of the coils relative to the magnets.

21. The fishing reel as set forth in claim 20, wherein the spool includes a tubular bobbin portion around which fishing line is to be wound, and a pair of flange portions formed on both ends of the bobbin portion, the flange portions having diameters that are larger than a diameter of the bobbin portion; and the circuit board is a washer shaped member that is adapted to be arranged so as to be concentric with the rotation shaft of the spool and face one of the flange portions.

22. The fishing reel as set forth in claim 20, wherein the external device connector is configured to receive from the external device brake force setting data that sets a brake force to be applied to the spool.

23. The fishing reel as set forth in claim 17, wherein the circuit board includes electronic circuits on both of its front and rear surfaces.

24. The fishing reel as set forth in claim 17, wherein the external device connector is configured to allow input and/or output of data between the microcomputer and the external device.

25. The fishing reel set forth in claim 17, wherein the external device connector is configured to receive from the external device data relating to the control program.

26. The fishing reel as set forth in claim 17, wherein the external device connector is configured to be connected to the external device that inspects the electronic circuit formed on the circuit board.

27. The fishing reel as set forth in claim 17, wherein the insulating film is formed by a hot melt molding method, in which a resin material is injected into a mold into which the circuit board with the electric components mounted thereon is set.

28. The fishing reel as set forth in claim 17, wherein the external device connector includes a socket that is mounted on the circuit board, the socket including an input/output terminal electrically connected to the electronic circuit.

29. The fishing reel as set forth in claim 17, wherein the electronic circuit device further includes a detachable cap member coupled to the external device connector.

30. A fishing reel adapted to be attached to a fishing rod and connected to an external device, comprising:

a reel unit;

a handle rotatably supported by the reel unit;

a spool rotatably mounted on a spool shaft and supported by the reel unit; and an electronic circuit device mounted on the reel unit and including a circuit board that includes an electronic circuit formed on at least one of front and rear surfaces thereof, a plurality of electric components including a microcomputer that controls the fishing equipment through a control program, the plurality of electric components being mounted on the circuit board such that they are electrically connected to the electronic circuit, an external device connector adapted to connect the external device to the electric circuit, and an insulating film that covers the circuit board at least partially so as to cover the electric components, the external device connector including a socket that is exposed to an exterior of the fishing equipment.

31. The fishing reel as set forth in claim 30, wherein the external device connector includes a connector adapted to be connected to the external device and a cable that connects the socket with the connector.

* * * * *